(12) United States Patent
Meyer

(10) Patent No.: US 12,039,330 B1
(45) Date of Patent: Jul. 16, 2024

(54) PROGRAMMABLE VECTOR ENGINE FOR EFFICIENT BEAM SEARCH

(71) Applicant: Amazon Technologies, Inc., Seattle, WA (US)

(72) Inventor: Paul Gilbert Meyer, Jericho, VT (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/447,677

(22) Filed: Sep. 14, 2021

(51) Int. Cl.
*G06F 9/30* (2018.01)
*G06N 3/02* (2006.01)

(52) U.S. Cl.
CPC ............. *G06F 9/3001* (2013.01); *G06N 3/02* (2013.01)

(58) Field of Classification Search
CPC ................................ G06F 9/3001; G06N 3/02
See application file for complete search history.

(56) References Cited

U.S. PATENT DOCUMENTS

| | | | | |
|---|---|---|---|---|
| 6,654,730 B1 * | 11/2003 | Kato | ...................... | G06N 3/063 706/15 |
| 6,757,284 B1 * | 6/2004 | Galles | ................... | H04L 49/552 370/394 |
| 7,755,631 B1 | 7/2010 | Mrazek et al. | | |
| 8,121,235 B1 * | 2/2012 | Sun | ................... | H04L 25/03343 375/299 |
| 9,710,265 B1 * | 7/2017 | Temam | ................. | G06F 9/3824 |
| 10,120,580 B2 | 11/2018 | Olcay | | |
| 10,157,333 B1 * | 12/2018 | Wang | .................. | G06F 16/9038 |
| 10,210,860 B1 * | 2/2019 | Ward | ....................... | G10L 25/18 |
| 10,592,250 B1 * | 3/2020 | Diamant | ................. | G06N 5/046 |
| 11,182,337 B1 * | 11/2021 | Maiyuran | ........... | G06F 15/8046 |
| 2004/0230784 A1 | 11/2004 | Cohen | | |
| 2005/0273481 A1 * | 12/2005 | Dent | ..................... | G06F 9/3001 708/277 |
| 2006/0095739 A1 * | 5/2006 | Selvaggi | ............. | G06F 9/30021 712/E9.02 |
| 2007/0073922 A1 | 3/2007 | Go et al. | | |
| 2007/0240142 A1 | 10/2007 | Brokenshire et al. | | |
| 2009/0119460 A1 | 5/2009 | Lin et al. | | |
| 2009/0293048 A1 | 11/2009 | Chen et al. | | |
| 2013/0258376 A1 | 10/2013 | Tsuchiya | | |
| 2014/0317333 A1 | 10/2014 | Dorst et al. | | |
| 2015/0277924 A1 | 10/2015 | Zappulla et al. | | |

(Continued)

OTHER PUBLICATIONS

"Search max value and index inside Nested list", https://stackoverflow.com/questions/18616793/search-max-value-and-index-inside-nested-list (Year: 2013).*

(Continued)

*Primary Examiner* — Farley Abad
(74) *Attorney, Agent, or Firm* — Weaver Austin Villeneuve & Sampson LLP

(57) ABSTRACT

To perform a beam search operation on an input tensor using a data processor with native hardware support, the data processor can be programmed with a set of instructions. The set of instructions can include a first machine instruction that operates on the input tensor to obtain N largest values in the input tensor, a second machine instruction that operates on the input tensor to obtain indices corresponding to the N largest values in the input tensor, and a third machine instruction that operates on the input tensor to replace the N largest values in the input tensor with a minimum value.

20 Claims, 19 Drawing Sheets

(56) References Cited

U.S. PATENT DOCUMENTS

| | | | | |
|---|---|---|---|---|
| 2018/0113006 A1* | 4/2018 | Tyrer | ............... | G08B 21/0492 |
| 2018/0253877 A1* | 9/2018 | Kozub | ............... | H04N 23/676 |
| 2019/0034785 A1* | 1/2019 | Murray | ............... | G06N 3/0454 |
| 2019/0266217 A1* | 8/2019 | Arakawa | ............... | G06F 7/462 |
| 2020/0211189 A1* | 7/2020 | Yip | ............... | G06T 7/0012 |
| 2020/0342632 A1 | 10/2020 | Frumkin et al. | | |
| 2020/0356837 A1 | 11/2020 | Hargil et al. | | |
| 2022/0343137 A1 | 10/2022 | Surendran et al. | | |
| 2022/0405556 A1* | 12/2022 | Lichtenau | ............... | G06N 3/08 |
| 2022/0414182 A1 | 12/2022 | Adelman et al. | | |
| 2023/0019151 A1* | 1/2023 | Ahmadi | ............... | G06N 3/063 |

OTHER PUBLICATIONS

"How do I get indices of N maximum values in a NumPy array?", https://stackoverflow.com/questions/6910641/how-do-i-get-indices-of-n-maximum-values-in-a-numpy-array (Year: 2011).*

U.S. Appl. No. 17/447,675, filed Sep. 14, 2021, Meyer.

Cook, J., "Accurately Computing Running Variance", John D. Cook Consulting [blog], Nov. 1, 2014, pp. 1-3, URL: https://www.johndcook.com/blog/standard_deviation/ [retrieved on Feb. 8, 2023].

Ioffe, S. et al., "Batch Normalization: Accelerating Deep Network Training by Reducing Internal Covariate Shift", 32nd International Conference on Machine Learning (ICML '15), Mar. 2, 2015, pp. 1-11, URL: https://arxiv.org/abs/1502.03167v3.

U.S. Appl. No. 17/934,145, inventors Meyer et al., filed on Sep. 21, 2022.

U.S. Appl. No. 17/934,147, inventors Meyer et al., filed on Sep. 21, 2022.

U.S. Appl. No. 17/935,415, inventors Meyer et al., filed on Sep. 26, 2022.

U.S. Appl. No. 17/935,419, inventors Meyer et al., filed on Sep. 26, 2022.

U.S. Appl. No. 17/937,329, inventors Meyer et al., filed on Sep. 30, 2022.

U.S. Appl. No. 17/937,333, inventors Meyer et al., filed on Sep. 30, 2022.

U.S. Appl. No. 17/937,335, inventors Meyer et al., filed on Sep. 30, 2022.

Wikipedia [webpage]. "Algorithms for calculating variance", Mar. 24, 2001, pp. 1-14, URL: https://en.wikipedia.org/wiki/Algorithms_for_calculating_variance [retrieved on Feb. 8, 2023].

U.S. Non-Final Office Action dated Oct. 4, 2023, in U.S. Appl. No. 17/934,147.

U.S. Restriction Requirement dated Sep. 28, 2023, in U.S. Appl. No. 17/937,333.

International Search Report and Written Opinion dated Nov. 2, 2023 in PCT Application No. PCT/US2023/073800.

U.S. Notice of Allowance dated Jan. 31, 2024 in U.S. Appl. No. 17/934,147.

* cited by examiner

PROGRAMMABLE VECTOR ENGINE FOR EFFICIENT BEAM SEARCH

BACKGROUND

Neural networks utilize computational models to perform complex tasks. A neural network can perform computations using a set of weights. Through these computations, the weights are combined with input data (which can also be referred to as feature maps) through multiple layers to perform an inference operation. For example, a neural network model can be used in natural language processing to translate and understand human language.

BRIEF DESCRIPTION OF THE DRAWINGS

Various embodiments in accordance with the present disclosure will be described with reference to the drawings, in which.

DETAILED DESCRIPTION

Figure 1:
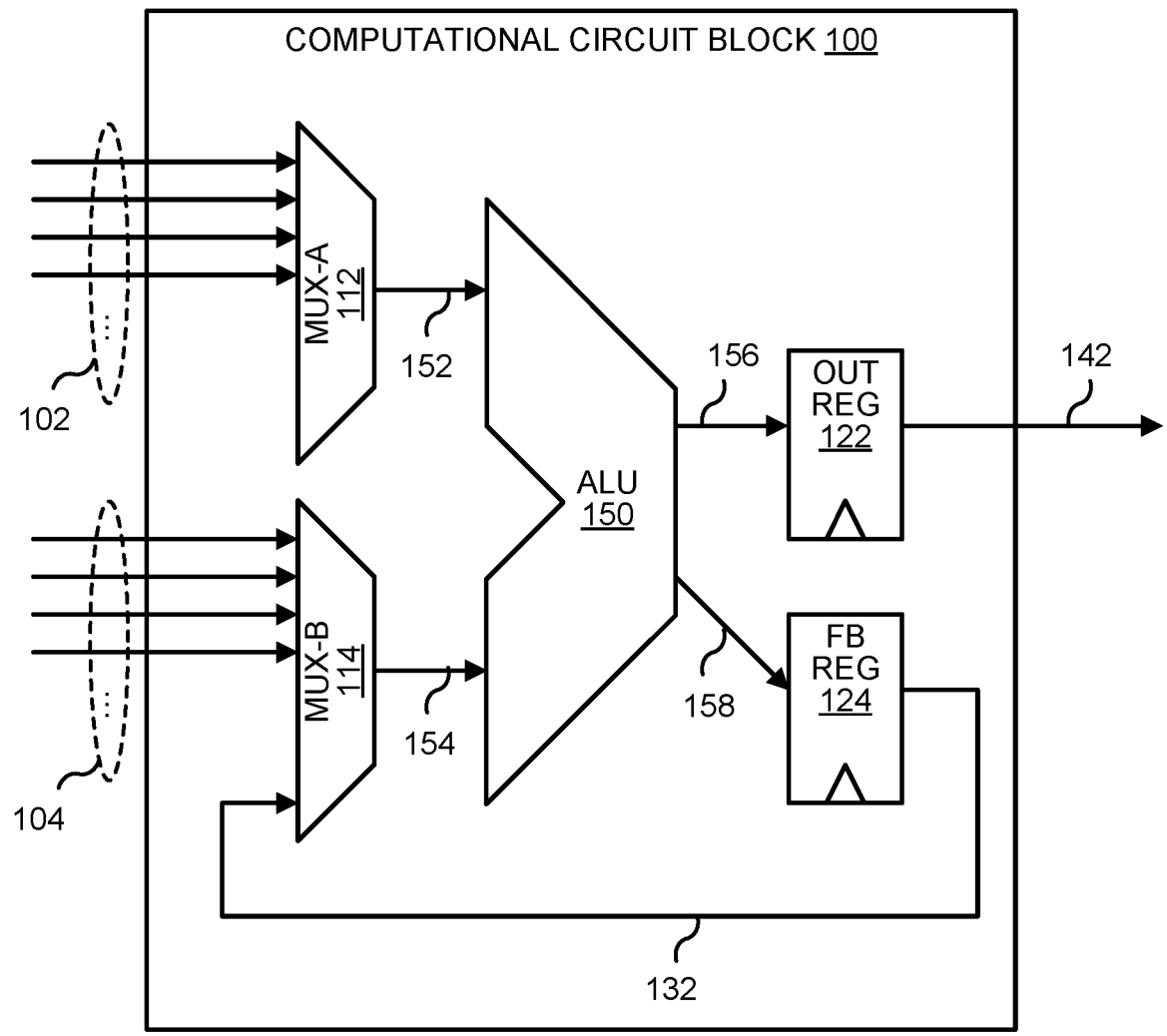
FIG. 1 illustrates a block diagram of an example of a computational circuit block.

Beam search is a useful technique in machine learning to perform sequence prediction. For example, in natural language processing such as language translation, the most common translation of a single word may not necessarily provide the best meaning when the word is taken into context with other words and phrases in a sentence. As such, instead of simply taking the highest probability prediction for each word, beam search considers a set of the most promising candidate predictions for a word, and continues the prediction for the next word spawning from each of the partial solutions. The number of candidate predictions or partial solutions to keep can be referred to as the beam width. The sequential predictions can continue until a certain search depth is reached. At that point, the sequence with the highest probability or highest score is chosen as the solution. Performing beam search on a large dataset is computationally expensive, and is generally done with the aid of software sorting algorithms. Such sorting algorithms may require extensive memory usage, resulting in poor throughput and long latency.

To improve the performance of beam search operations, the computational pipeline of an execution engine of a data processor can be designed to provide native hardware support for subfunctions used in beam search operations. The computational pipeline includes a set of arithmetic logic unit (ALU) stages coupled in series. Each ALU stage can perform various arithmetic operations on a set of inputs and provides the result to the next ALU stage. To support the beam search subfunctions, each ALU stage is implemented with a feedback path to allow the ALU stage to retain an input value. This feedback path allows the computational pipeline to efficiently find a set of the largest values in a tensor being streamed into the computational pipeline, and obtain the indices indicating the locations of those values in the tensor. The feedback path can also be used to replace the largest values found in the tensor when the beam width (number of largest values to keep) is wider the number of pipeline stages such that multiple execution iterations can be performed to find additional largest values.

To take advantage of the native hardware support for the subfunctions used in beam search operations, new machine instructions are introduced such that the hardware can be programmed to utilize the ALU feedback path. These machine instructions include a Max-N machine instruction to find the N largest values in a tensor (where N is the number of ALU stages in the pipeline), a Find-Index-N machine instruction to find the indices of those values, and a Match-Replace-N machine instruction to replace those values in the tensor with a replacement value. For example, to perform a beam search operation to find the N largest values and their indices in a tensor, the data processor can be programmed with the assembly-level instructions of Max-N and Find-Index-N. For wider beam search operations to find additional largest values, the data processor can be programmed to perform multiple iterations of Max-N, Find-Index-N, and Match-Replace-N to cycle through the input tensor to find the requisite number of largest values.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates a block diagram of an example of a computational circuit block 100 that can be implemented in a computational pipeline of an integrated circuit device. Computational circuit block 100 includes an arithmetic logic unit (ALU) circuit 150. ALU circuit 150 can be configurable to support inputs of various datatypes such as 8-bit integers (INT8), 16-bit integers (INT16), 16-bit brain floating point numbers (BF16), 16-bit floating point numbers (FP16), 32-bit floating point numbers (FP32), etc. ALU circuit 150 includes a first numeric input 152, a second numeric input 154, a primary result output 156, and a secondary output 158. ALU circuit 150 is programmable to perform various arithmetic functions on first numeric input 152 and/or second numeric input 154 to generate primary result output 156.

For example, ALU circuit 150 can be programed to generate primary result output 156 by selecting an arithmetic function to perform on the numeric input(s) such as a passthrough function (or identity function) of first numeric input 152, bitwise inversion of first numeric input 152, left shift of first numeric input 152 by a number of bits indicated by second numeric input 154, right shift of first numeric input 152 by a number of bits indicated by second numeric input 154, addition of first numeric input 152 and second numeric input 154, subtraction of second numeric input 154 from first numeric input 152, multiplication of first numeric input 152 and second numeric input 154, division of first numeric input 152 by second numeric input 154, select the maximum (MAX) of first numeric input 152 and second numeric input 154, select the minimum (MIN) of first numeric input 152 and second numeric input 154, bitwise AND of first numeric input 152 and second numeric input 154, bitwise OR of first numeric input 152 and second numeric input 154, and/or bitwise XOR of first numeric input 152 and second numeric input 154, etc. In some implementations, ALU circuit 150 can be programmed to perform a matching operation on first numeric input 152 and second numeric input 154 to determine if first numeric input 152 matches second numeric input 154 (e.g., equal to each other), and to generate a match signal (not shown) indicating as such.

Although ALU circuit 150 has been described as supporting various programmable arithmetic functions, the beam search operation may utilize just a subset of such functions. For example, in some implementations, a beam search operation may utilize only the minimum and matching functions of ALU circuit 150. The matching function can alternatively be implemented outside of ALU circuit 150. As such, depending the usage of ALU circuit 150 for other computations, the computational logic within ALU circuit can be simplified to support fewer of the arithmetic functions described above. In some implementations, ALU circuit 150 can also support other arithmetic functions not specifically described.

Secondary output 158 can be used to loopback the first numeric input 152 or the second numeric input 154 back to the second numeric input 154 of ALU circuit 150. Thus, secondary output 158 can provide a feedback path 132 for ALU circuit 150 to retain a value that is being streamed into ALU circuit 150 (e.g., by storing the value in feedback register 124). This capability of ALU circuit 150 allows a computation pipeline composed of such ALU stages to efficiently find and locate values in a tensor being streamed into the pipeline, and thus is used to provide native hardware support for the subfunctions used in beam search operations. Additional details of such will be described further below.

Computational circuit block 100 also includes a first multiplexer MUX-A 112 coupled to ALU circuit 150 to select the first numeric input 152 for ALU circuit 150, and a second multiplexer MUX-B 114 coupled to ALU circuit 150 to select the second numeric input 154 for ALU circuit 150. The set of inputs 102 selectable by multiplexer MUX-A 112 can be the same as or may overlap with the set of inputs 104 selectable by multiplexer MUX-B 114. The selectable inputs may include data stored at memory locations specified by the machine instruction being executed; one or more constant values specified by the machine instruction being executed or stored at a constant register; common values such as zero, one, a value representing positive infinity, a value representing negative infinity, etc. In some implementations, the selectable inputs may also include the primary result output of the ALU circuit 150 being feedback to itself, and/or one or more primary result outputs of subsequent ALU stages to allow complex computations to be performed.

Computational circuit block 100 also includes an output register 122 configured to receive primary result output 156 of ALU circuit 150, and provide primary result output 156 of ALU circuit 150 as the output 142 of computational circuit block 100. By registering primary result output 156, pipeline stages of computational circuit block 100 can be coupled in series to create a computational pipeline in which input values are operated on at each clock cycle by an ALU stage, and the result is provided to the next ALU stage for further processing in the next clock cycle. Computational circuit block 100 also includes a feedback register 124 configured to receive the secondary output 158 of ALU circuit 150, and to feedback the secondary output 158 as an additional input to the second multiplexer MUX-B 114. It should be noted that in some implementations, the secondary output is not provided to the next ALU stage. As mentioned above, feedback register 124 can be used to store and retain a value being streamed into computational circuit block 100 to allow efficient find and locate functions to be performed.

Figure 2:
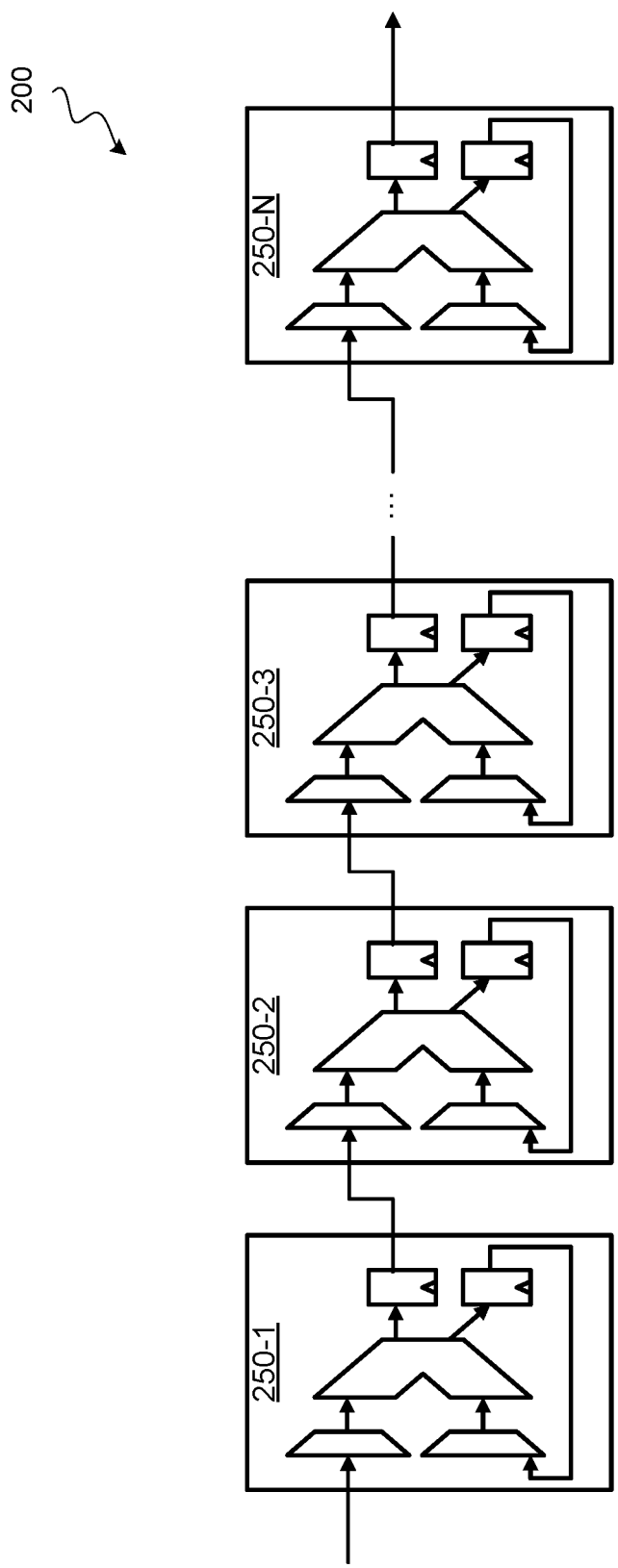
FIG. 2 illustrates a block diagram of an example of a processing circuit.

FIG. 2 illustrates an example of a processing circuit 200, according to some implementations. Processing circuit 200 can be implemented, for example, in an execution engine of a data processor (e.g., a data processing integrated circuit device such as a processor, a graphics processor, a digital signal processor, a tensor processor, a neural network accelerator, or other types of application specific integrated circuits). Processing circuit 200 includes multiple computational circuit blocks 250-1 to 250-N coupled in series to form a pipeline. The number of computational circuit blocks N coupled in series can be four, eight, ten, sixteen, or other suitable number. Each computational circuit block in processing circuit 200 can be implemented, for example, using computational circuit block 100. For ease of illustration, some of the details of computational circuit block 100 such as the selectable inputs to the multiplexers have been omitted. It should be understood that each of computational circuit blocks 250-1 to 250-N may include additional inputs and/or other components not specifically shown.

Each of computational circuit blocks 250-1 to 250-N includes an ALU circuit, and thus the pipeline in processing circuit 200 can be considered as an ALU pipeline having multiple ALU stages coupled in series. Each ALU stage has a first numeric input, a second numeric input, a primary result output, and a secondary output coupled to a feedback register to provide a feedback value to the second numeric input of the ALU stage. Each of the ALU stage is programmable to perform an arithmetic function on the first numeric input and/or the second numeric input of the ALU stage to generate the primary result output. The primary result output is provided to the next ALU stage. For example, the primary result output of computational circuit block 250-1 can be provided as the first numeric input of computational circuit block 250-2. In some implementations, each ALU stage can be independently programmed such that some or all of the ALU stages perform a different arithmetic function. Likewise, each ALU stage in the pipeline can be programmed to perform the same arithmetic function. In some implementations, the specific arithmetic function programmed into each ALU stage can be dependent on the particular machine instruction being executed by the execution engine that processing circuit 200 is part of.

During operation, a large amount of data such as elements of a tensor can be streamed into the ALU pipeline for high throughput processing. As such processing circuit 200 may be referred to as a vector engine. By way of example, elements of a tensor can be streamed into the first numeric input of the first ALU stage (computational circuit block 250-1) along the ALU pipeline such that each ALU stage can perform an arithmetic function on a tensor element at every clock cycle. As an element travels down the pipeline, various combinations of complex functions can be performed on the element before the result exits the pipeline.

As mentioned above, by having a secondary output to provide a feedback path that can be used by an ALU stage to retain an element being streamed into the pipeline, functions such as finding a set of largest values in a tensor can be performed efficiently at the hardware level. To illustrate this capability, FIGS. 3A-D shows a series of state diagrams 300A-D of operating a 4-stage ALU pipeline to find the top four values (four largest values) from a list of values [30.0, 21.2, 33.1, −2.5, 31.0, 40.2, 17.3, 40.2] representing an input tensor. The values flowing through the pipeline and being stored in the feedback register at each cycle are shown as circled values. Although only 4 stages are shown, it should be understood that the pipeline can be extended to any number of pipeline stages. The number of pipeline stages corresponds to the number of values the pipeline can find over one pass of the input tensor. For ease of explanation, the pipelined ALU stages will be referred to as ALU stage-1 for the leftmost block receiving the input values, and incrementing along the pipeline until ALU stage-4 for the rightmost block where the processed values exit.

Figure 3A:
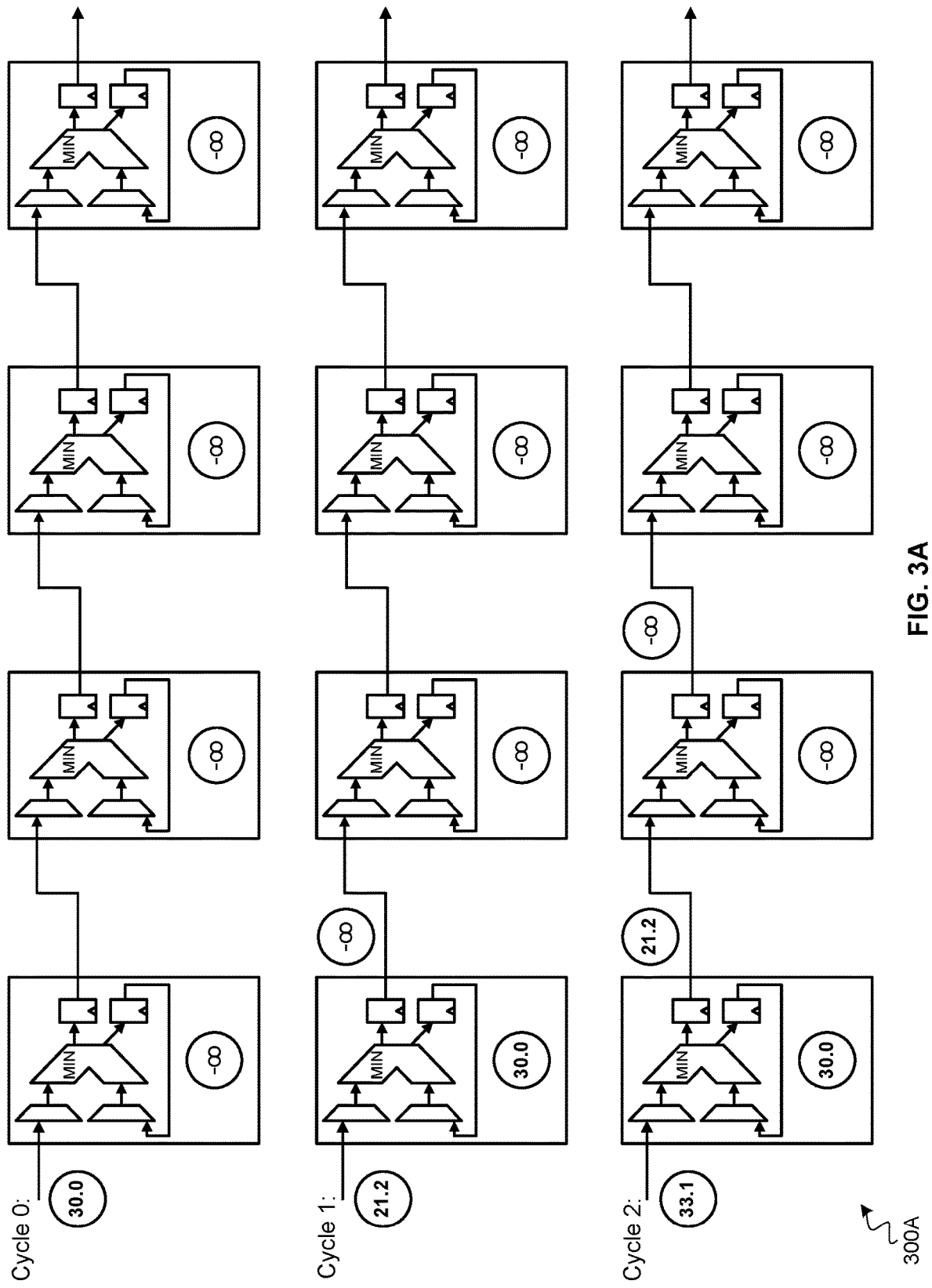
FIGS. 3A-3D illustrates a series of state diagrams of operating a processing circuit.

Referring to FIG. 3A, to perform the operation to find the set of largest values, the feedback registers of all ALU stages are initialized to a minimum value prior to streaming the input values into the pipeline. The minimum value can depend on the datatype of the input values. For example, the minimum value can be a value representing negative infinity (−∞) when processing signed floating point numbers. Each ALU stage is configured to perform a minimum function (MIN). The MIN function selects a minimum of the first and second numeric inputs to output on the primary result output of the ALU stage, and outputs the other input (the unselected one of the first and second numeric inputs) on the secondary output. In other words, if A<B, A will be outputted on the primary result output to the next ALU stage, and B will be provided on the secondary output to the feedback register. The first multiplexer for the first numeric input of each ALU is configured to select the input data path to stream in input values, and the second multiplexer for the second numeric input of each ALU is configured to select the feedback value from the feedback register.

At cycle 0, elements of the input tensor begin streaming into the first numeric input of the first ALU stage-1. Referring to the list of values above, the first value in the input tensor is 30.0. ALU stage-1 then selects the minimum of 30.0 and −∞, and outputs the lesser of the two on the primary result output for the next ALU stage. The other value is provided on the secondary output to the feedback register. At cycle 1, −∞ is outputted from ALU stage-1 to ALU stage-2 because −∞ is the minimum of −∞ and 30.0. Meanwhile, 30.0 is outputted on the secondary output and stored in the feedback register, and the next value 21.2 is streamed into ALU stage-1. Next, at cycle 2, ALU stage-2 outputs −∞ and stores −∞ in the feedback register since both input values to ALU stage-2 are −∞. ALU stage-1 outputs 21.2, because 21.2 is the minimum of 21.2 and 30.0, and stores 30.0 in the feedback register. Meanwhile, the next value 33.1 is streamed into ALU stage-1.

Figure 3B:
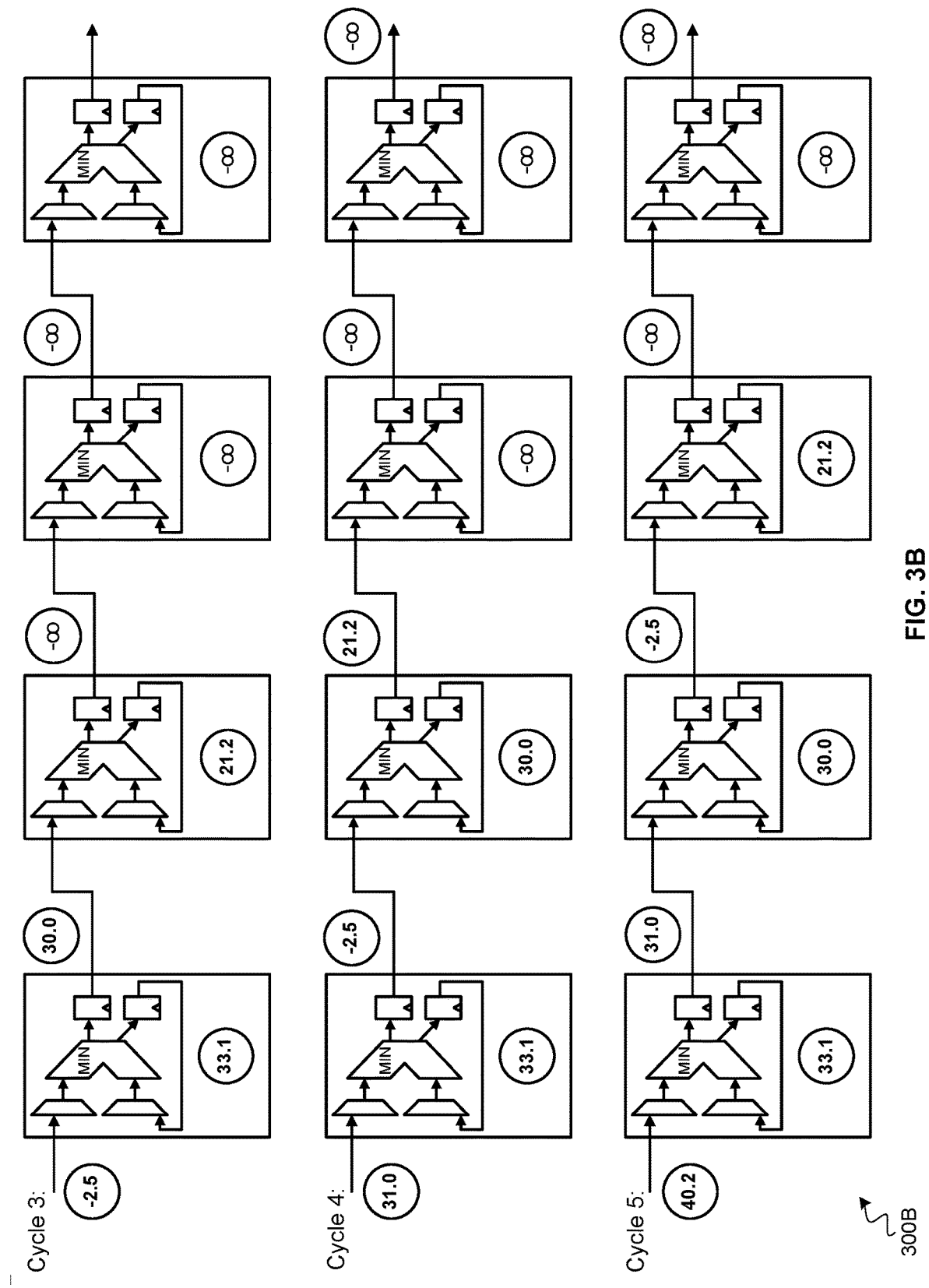

Referring now to FIG. 3B, at cycle 3, ALU stage-3 outputs −∞ and stores −∞ in the feedback register since both input values to ALU stage-3 are −∞. ALU stage-2 outputs −∞ and stores 21.2 in the feedback register because −∞ is the minimum of −∞ and 21.2. ALU stage-1 outputs 30.0 and stores 33.1 in the feedback register because 30.0 is the minimum of 30.0 and 33.1. Meanwhile, the next input value −2.5 is streamed into ALU stage-1.

At cycle 4, ALU stage 4 outputs −∞ and stores −∞ in the feedback register since both input values to ALU stage-4 are −∞. ALU stage 3 outputs −∞ and stores −∞ in the feedback register since both input values to ALU stage-3 are also −∞. ALU stage-2 outputs 21.2 and stores 30.0 in the feedback register because 21.2 is the minimum of 21.2 and 30.0. ALU stage-1 outputs −2.5 and stores 33.1 in the feedback register because −2.5 is the minimum of −2.5 and 33.1. Meanwhile, the next input value −31.0 is streamed into ALU stage-1.

At cycle 5, ALU stage-4 outputs −∞ and stores −∞ in the feedback register since both input values to ALU stage-4 are −∞. ALU stage-3 outputs −∞ and stores 21.2 in the feedback register because −∞ is the minimum of −∞ and 21.2. ALU stage-2 outputs −2.5 and stores 30.0 in the feedback register because −2.5 is the minimum of −2.5 and 30.0. ALU stage-1 outputs 31.0 and stores 33.1 in the feedback register because 31.0 is the minimum of 31.0 and 33.1. Meanwhile, the next input value 40.2 is streamed into ALU stage-1.

Figure 3C:
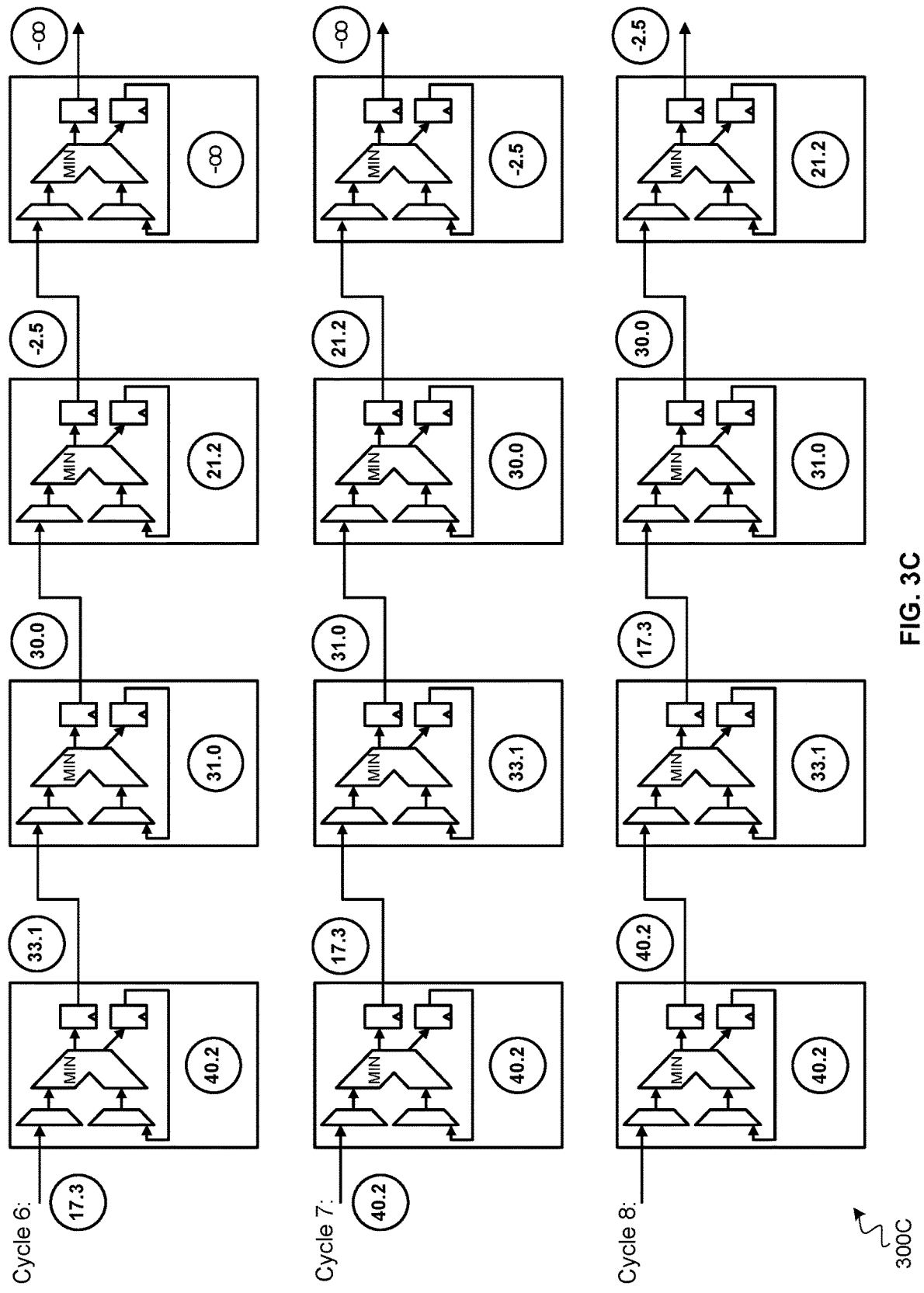

Referring now to FIG. 3C, at cycle 6, ALU stage-4 outputs −∞ and stores −∞ in the feedback register since both input values to ALU stage-4 are −∞. ALU stage-3 outputs −2.5 and stores 21.2 in the feedback register because −2.5 is the minimum of −2.5 and 21.2. ALU stage-2 outputs 30.0 and stores 31.0 in the feedback register because 30.0 is the minimum of 30.0 and 31.0. ALU stage-1 outputs 33.1 and stores 40.2 in the feedback register because 33.1 is the minimum of 33.1 and 40.0. Meanwhile, the next input value 17.3 is streamed into ALU stage-1.

At cycle 7, ALU stage-4 outputs −∞ and stores −2.5 in the feedback register because −∞ is the minimum of −∞ and −2.5. ALU stage-3 outputs 21.2 and stores 30.0 in the feedback register because 21.2 is the minimum of 21.2 and 30.0. ALU stage-2 outputs 31.0 and stores 33.1 in the feedback register because 31.0 is the minimum of 31.0 and 33.1. ALU stage-1 outputs 17.3 and stores 40.2 in the feedback register because 17.3 is the minimum of 17.3 and 40.2. Meanwhile, the last input value 40.2 is streamed into ALU stage-1.

At cycle 8, ALU stage-4 outputs −2.5 and stores 21.2 in the feedback register given that −2.5 is the minimum of −2.5 and 21.2. In some implementations, the values exiting the pipeline can be discarded. ALU stage-3 outputs 30.0 and stores 31.0 in the feedback register because 30.0 is the minimum of 30.0 and 31.0. ALU stage-2 outputs 17.3 and stores 33.1 in the feedback register because 17.3 is the minimum of 17.3 and 33.1. ALU stage-1 outputs 40.2 and stores 40.2 in the feedback register since both input values to ALU stage-1 are 40.2. No addition input values are streamed in at this point because the end of the input tensor has been reached.

Figure 3D:
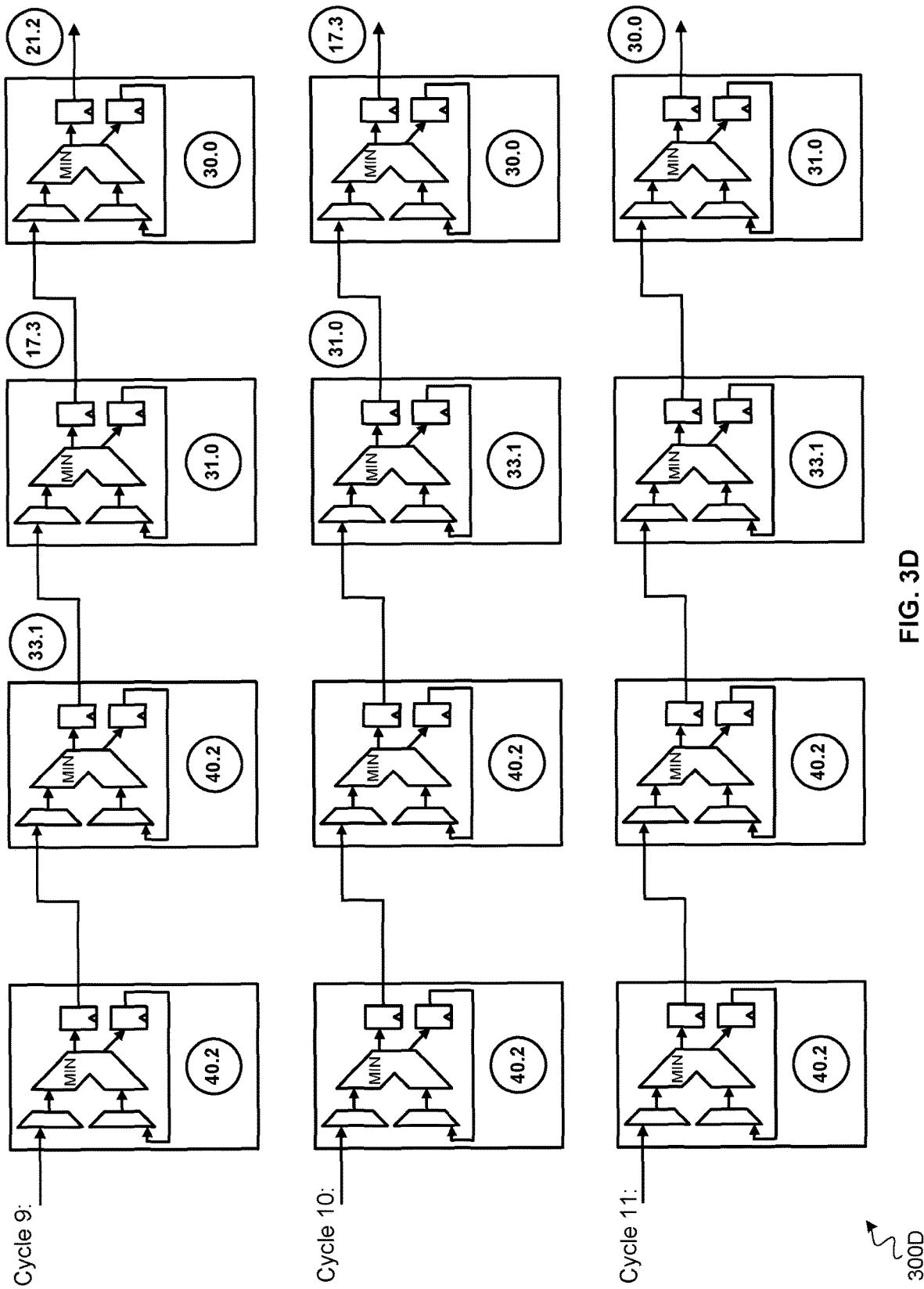

Referring now to FIG. 3D, at cycle 9, ALU stage-4 outputs 21.2 and stores 30.0 in the feedback register because 21.2 is the minimum of 21.2 and 30.0. ALU stage-3 outputs 17.3 and stores 31.0 in the feedback register because 17.3 is the minimum of 17.3 and 31.0. ALU stage-2 outputs 33.1 and stores 40.2 in the feedback register because 33.1 is the minimum of 33.1 and 40.2. ALU stage-1 retains 40.2 in the feedback register because no addition input value is streamed into ALU stage-1.

At cycle 10, ALU stage-4 outputs 17.3 and stores 30.0 in the feedback register because 17.3 is the minimum of 17.3 and 30.0. ALU stage-3 outputs 31.0 and stores 33.1 in the feedback register because 31.0 is the minimum of 31.0 and 33.1. ALU stage-2 and ALU stage-1 both retain 40.2 in their respective feedback registers. At cycle 11, ALU stage 4 outputs 30.0 and stores 31.0 in the feedback register because 30.0 is the minimum of 30.0 and 31.0. ALU stage-3 retains 33.1 in the feedback register, and ALU stage-2 and ALU stage-1 both retain 40.2 in their respective feedback registers.

At this point, the last input value exits the pipeline, and the set of four largest values are stored in the feedback registers of the pipeline. It should be noted that the values stored in the feedback registers are sorted in descending order with the largest value being stored at the first pipeline stage (ALU stage-1). The set of largest values found also allows for duplicate values (e.g., 40.2 in FIG. 3D), and each duplicate value is treated as a separate value. In other words, the two occurrences of 40.2 in FIG. 3D are counted as two of the four largest values.

To read out the set of largest values from the feedback registers in the pipeline, each ALU can be configured to perform a MIN function (as they are already), and a set of maximum values (e.g., a value representing positive infinity) can be streamed into the first numeric input of ALU stage-1 along the pipeline. The MIN function of each ALU stage will select the values stored in the feedback registers to output, and thereby cause the set of largest values from the input tensor stored in the feedback registers to be outputted from the pipeline. Alternatively, each ALU can be configured to perform a MAX function that selects a maximum of the first and second numeric inputs to output on the primary result output. A set of minimum values (e.g., a value representing negative infinity) can be streamed into the first numeric input of ALU stage-1 along the pipeline. The MAX function of each ALU stage will select the values stored in the feedback registers to output, and thereby cause the set of largest values from the input tensor stored in the feedback registers to be outputted from the pipeline.

Figure 4A:
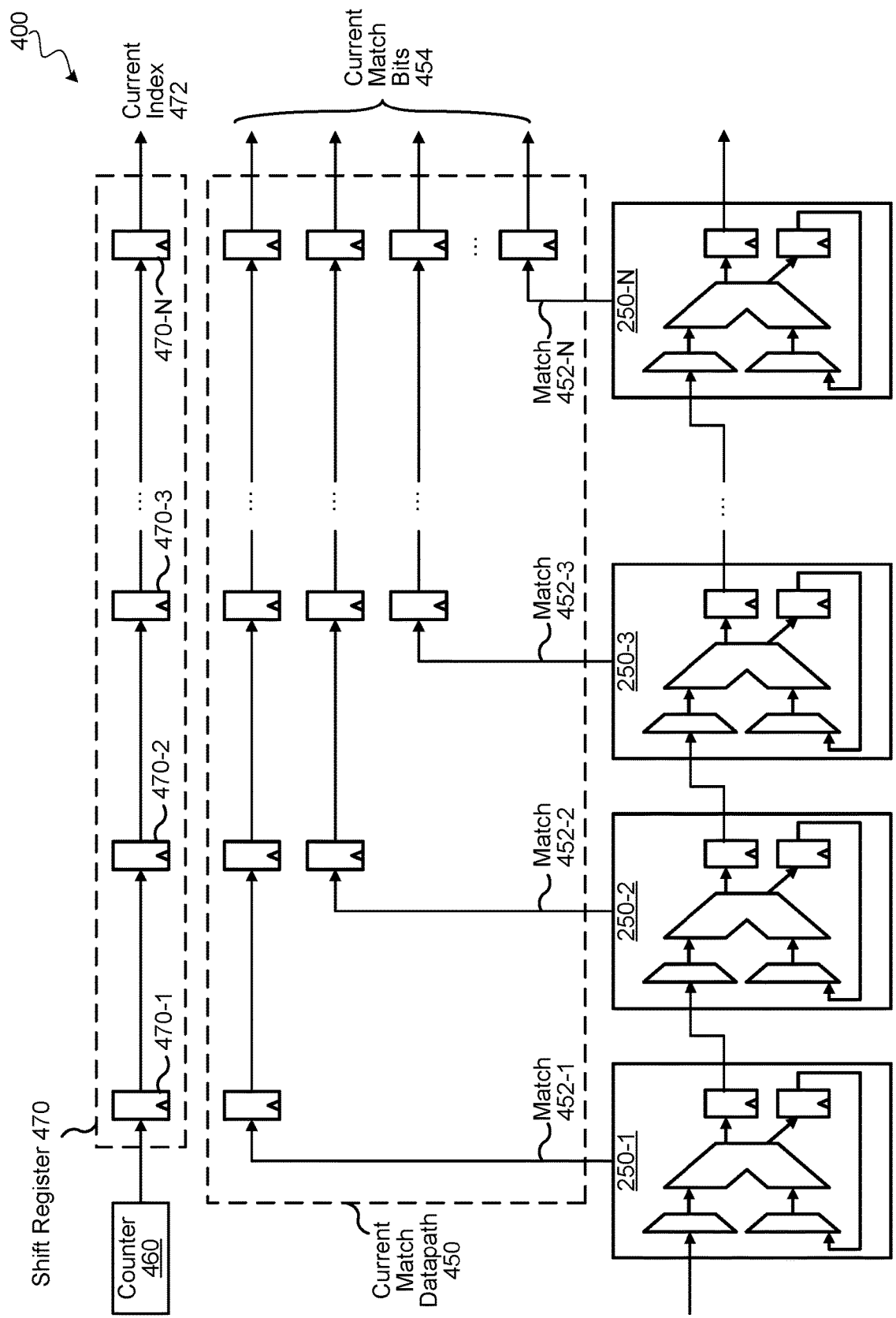
FIG. 4A illustrates a first portion of a block diagram of an example of a processing circuit that includes indexing logic.
Figure 4B:
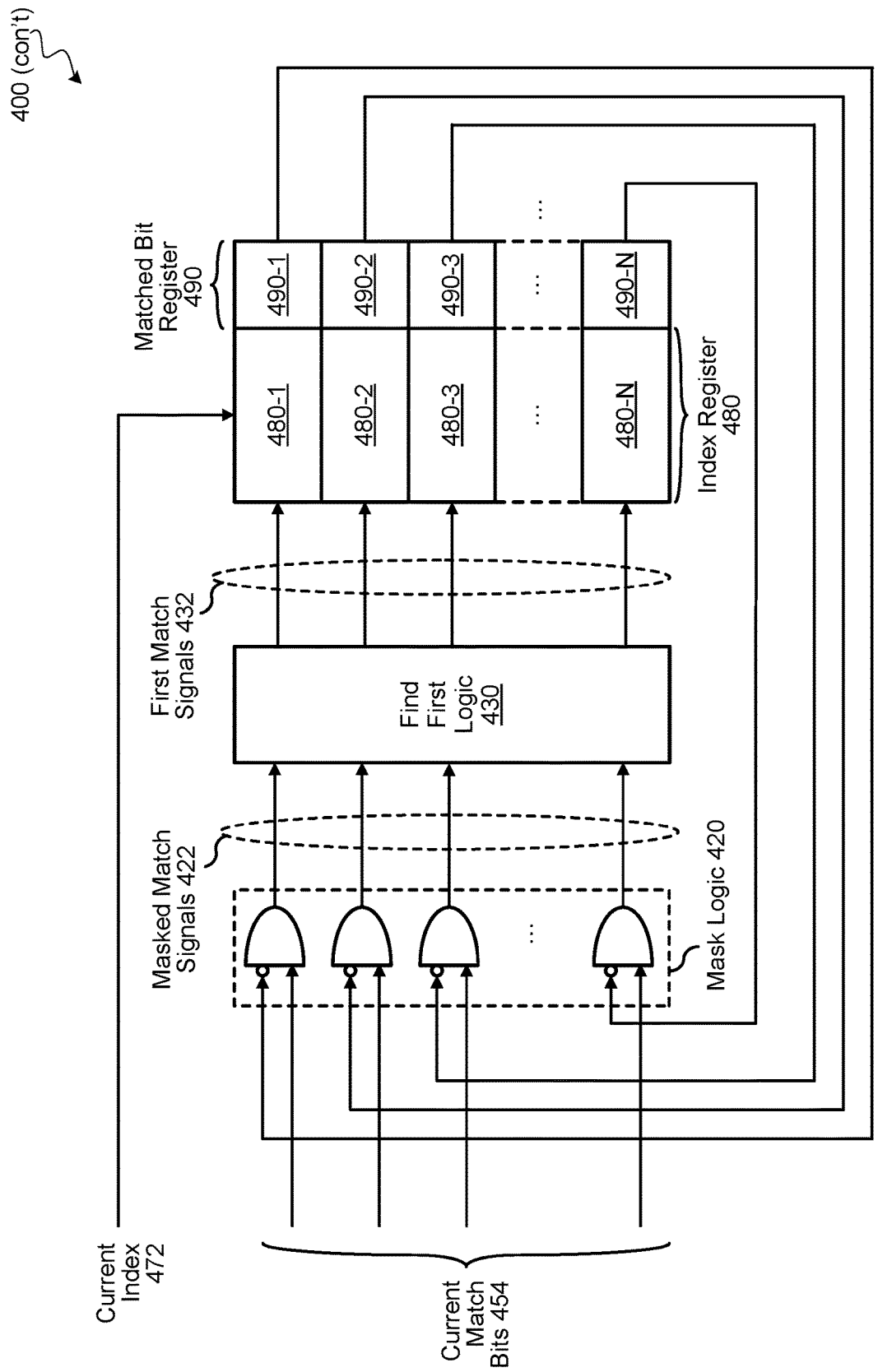
FIG. 4B illustrates a second portion of a block diagram of an example of a processing circuit that includes indexing logic.

In addition to obtaining the set of largest values or the top N values from an input tensor, the beam search operation also identifies the locations of those values in the input tensor. FIGS. 4A-B illustrates a block diagram of an example of a processing circuit 400 having indexing logic to provide native hardware support to find the indices corresponding to the set of largest values or the top N values found in an input tensor. In addition to computational circuit blocks 250-1 to 250-N that are coupled in series to form the computational pipeline, processing circuit 400 also includes a counter 460, a shift register 470, a current match datapath 450, mask logic 420, find first logic 430, an index register 480, and a matched bit register 490.

Referring to FIG. 4A, counter 460 is configured to generate index values for the input values being streamed into the pipeline. Counter 460 is initialized to a reset value (e.g., zero) before the elements of the input tensor are streamed into the pipeline, and is incremented for each element being streamed into the pipeline. Hence, the counter value outputted from counter 460 tracks the number of elements being streamed into the pipeline, and can be used as an index to identify the location of the input value in the tensor.

Shift register 470 is configured to receive the index values generated from counter 460, and to shift the index values in parallel with the corresponding input values being streamed into the pipeline. Shift register 470 includes the same number of register stages as the number of stages in the pipeline. Hence, shift register 470 includes N number of register stages 470-1 to 470-N corresponding to N number of computational circuit blocks 250-1 to 250-N of the pipeline. As input values are streamed into the pipeline, the counter values corresponding to the indices of the input values are also shifted along shift register 470 in synchronism.

To obtain the indices of the top N values found in a tensor, the set of largest values are first loaded into the feedback registers of the pipeline (if they not already stored therein). The set of largest values can be loaded into the feedback registers, for example, by initializing the feedback registers with a minimum value (e.g., a value representing negative infinity), configuring the ALUs to perform a MIN function, and streaming the top N values into the pipeline. Alternatively, the set of largest values can be loaded into the feedback registers, for example, by initializing the feedback registers with a maximum value (e.g., a value representing positive infinity), configuring the ALUs to perform a MAX function, and streaming the top N values into the pipeline.

Once the set of largest values or the top N values have been loaded into the feedback registers, the elements of the tensor can be streamed into the first numeric input of the first ALU stage along the pipeline while the set of largest values of the tensor are being stored in the feedback registers. Each ALU stage can be configured to passthrough the first numeric input. Concurrently, the index values generated from counter 460 are also shifted along shift register 470 in parallel with the corresponding elements of the tensor. As the elements of the tensor traverse down the pipeline, for each element of the tensor that matches a value stored in a feedback register, a match signal is asserted by matching circuitry associated with the computational circuit block.

As shown in FIG. 4A, each of computational circuit blocks 250-1 to 250-N generates one of match signals 452-1 to 452-N to indicate whether a tensor element traversing down the pipeline matches the value stored in the corresponding feedback register. The current match datapath 450 includes a series of flip-flops to collect and align the match signals at the end of the pipeline to generate current match bits 454. By way of example, the current match datapath 450 includes N number of flip-flop stages for match signal 452-1 associated with the first computational circuit block 250-1, N−1 number of flip-flop stages for match signal 452-2 associated with the second computational circuit block 250-2, and so on, and one flip-flop stage for match signal 452-N associated with the last computational circuit block 250-N. The effect of current match datapath 450 is to generate a set of N number of current match bits 454 aligned with the current index 472 at the end of the pipeline to indicate which of the pipeline stages found a match with the tensor element corresponding to that index value.

The match signals 452-1 to 452-N from computational circuit blocks 250-1 to 250-N are collected to account for potential duplicate values stored in the feedback registers. For example, if the top N values of the tensor includes two elements of the same value, then the same value will be stored in two of the feedback registers of the pipeline. When an occurrence of that value is streamed into the pipeline, two matches will be found. However, only one index value may be captured for that tensor element even though two matches are found. Collection and alignment of match signals 452-1 to 452-N can be used to capture the index value for only one pipeline stage when a tensor contains duplicate top values. Additional details are discussed with reference to FIG. 4B.

Referring now to FIG. 4B, processing circuit 400 further includes mask logic 420, find first logic 430, index register 480, and matched bit register 490. Index register 480 is configured to store the current index value 472 from the shift register 470 when an input value being streamed into the pipeline is a first match for a value stored in the corresponding feedback register. Index register 480 includes one index entry for each pipeline stage. Hence, index register 480 includes N number of entries 480-1 to 480-N corresponding to N number of computational circuit blocks 250-1 to 250-N of the pipeline, and there is a one-to-one correspondence between an index entry in index register 480 and a feedback register of a pipeline stage. As input values or elements from the tensor are streamed into the pipeline, the first occurrence of a match between the input value and the stored value in the feedback register of a pipeline stage will trigger the current index value 472 to be written into the index entry of index register 480 corresponding to the matching pipeline stage. At each cycle at the end of the pipeline, at most one index entry of index register 480 may be written if a first match to a tensor element is found. If no matches are found, none of the index entries of index register 480 will be written.

To keep track of which value has already been matched such that an index entry of a duplicate value is not overwritten by a subsequent match, matched bit register 490 is configured to store a matched bit for each feedback register to indicate whether a first match between a value stored in the corresponding feedback register and the first numeric input of the corresponding pipeline stage has been found. Matched bit register 490 includes one matched bit for each pipeline stage. Hence, matched bit register 490 includes N number of matched bits 490-1 to 490-N corresponding to N number of computational circuit blocks 250-1 to 250-N of the pipeline. When a first match between the first numeric input and the stored value in the feedback register of a pipeline stage is found, the corresponding matched bit in matched bit register 490 is set. The matched bit remains set for the duration of streaming the tensor into the pipeline.

To determine the first match of a tensor element, the current match bits 454 that are aligned with the current index value 472 for the tensor element are gated with matched bits 490-1 to 490-N from the matched bit register 490 by mask logic 420 to generate masked matched signals 422. If the current tensor element matches a pipeline stage that has previously been matched, then the corresponding matched bit in matched bit register 490 is already set, and the current match bit for that pipeline stage will be masked by mask logic 420. Hence, mask logic 420 can be used to prevent finding a first match for a previously matched pipeline stage.

However, when an input value matching multiple values in the pipeline is streamed into the pipeline for the first time, none of the corresponding matched bits are set, and multiple masked match signals 422 will be asserted. To account for potential duplicate matches, find first logic 430 is configured to select the first of any duplicate matches indicated by the masked match signals 422 to generate first match signals 432. In any given cycle, either none of the first match signals 432 may be asserted (when the tensor element does not match any values in the feedback registers), or at most one of the first match signals 432 may be asserted when a match is found. In other words, find first logic 430 can be used to mask any duplicate matches such that at most one first match is found in a given cycle. Find first logic 430 can be used to mask out duplicate matches even when there are more than two of the same values stored. In some implementations, the first match signals 432 generated by find first logic 430 can be used as a write enable signal for the corresponding index entry of index register 480.

By way of illustration, referring back to FIG. 3D and using the same input tensor and N=4 as an example, suppose the value 33.1 of ALU stage-3 is loaded in the feedback register of computational circuit block 250-3, and the list of values [30.0, 21.2, 33.1, −2.5, 31.0, 40.2, 17.3, 40.2] representing an input tensor are streamed into the pipeline. The value 33.1 is the third element of the list, and may correspond to an index value of 3 in the tensor (e.g., if the index value starts at 1 for the first element, though in some implementations, the index value may start at 0 for the first element). As the input value of 33.1 is streamed into the pipeline, the index value of 3 generated by counter 460 is also shifted in parallel with the input value. When the input value 33.1 progresses to computational circuit block 250-3, since the input value of 33.1 matches the stored value in the feedback register of computational circuit block 250-3, match signal 452-3 is asserted. At the end of the pipeline, because the input value of 33.1 did not match any other pipeline stages, the current match bits 454 will have a value of 'b0010 and the current index value 472 will be 3. Since this is the first tensor element matching any of the feedback registers and is the only match during this cycle, the masked match signals 422 and first match signals 432 will also be driven with a value of 'b0010. This will trigger the current index value of 3 to be written into index entry 480-3 of index register 480, and matched bit 490-3 is set to indicate a first match has been found at this pipeline stage.

Continuing with the same example above, when the first occurrence of the input value 40.2 is streamed into the pipeline, the index value of 6 is shifted along shift register 470. At the end of the pipeline, the current match bits 454 will have a value of 'b1100 because the input value of 40.2 matched both stages 250-1 and 250-2, and the current index value 472 will be 6. Although matched bits 490-3 and 490-N would have already been set (the input values 33.1 and 31.0 would have been already matched in previous cycles), matched bits 490-1 and 490-2 are still not set at this point. Thus, the masked match signals 422 will be driven with a value of 'b1100. Find first logic 430 will mask the duplicate match and first match signals 432 will be driven with a value of 'b1000. This will trigger the current index value of 6 to be written into index entry 480-1 of index register 480, and matched bit 490-1 is set to indicate a first match has been found at this pipeline stage. At this point in time, the matched bits register 490 will have a value of 'b1011 because the first occurrence of 40.2 and the values of 33.1 and 31.0 have been matched.

Next, when second occurrence of the input value 40.2 is streamed into the pipeline, the index value of 8 is shifted along shift register 470. At the end of the pipeline, the current match bits 454 will have a value of 'b1100 because the input value of 40.2 matched both stages 250-1 and 250-2, and the current index value 472 will be 8. Since matched bits 490-1 has already been set, the masked match signals 422 will be driven with a value of 'b0100. First match signals 432 will also be driven with a value of 'b0100. This will trigger the current index value of 8 to be written into index entry 480-2 of index register 480, and matched bit 490-2 is set to indicate a first match has been found at this pipeline stage. At this point in time, each index entry of index register 480 has been written with a corresponding index value, and all matched bits in matched bit register 490 are set.

As this example illustrate, upon completion of streaming the elements of a tensor into the pipeline while the set of largest values or the top N values of the tensor are stored in the feedback registers, the indices corresponding to the top N values will be stored in index register 480. Hence, by streaming the tensor into a pipeline with N stages twice, the top N values and their corresponding indices in the tensor can be found.

It should be noted that because there is a one-to-one correspondence between a pipeline stage to an index entry in index register 480, a matched bit in matched bit register 490, and a register stage in shift register 470, one or more of these components can be implemented in the computation circuit block itself. In some implementations, shift register 470 can be omitted, and an offset corresponding to the number of pipeline stages can be applied to the counter value from counter 460 before being written into the corresponding index entry when a first match is found.

Figure 5:
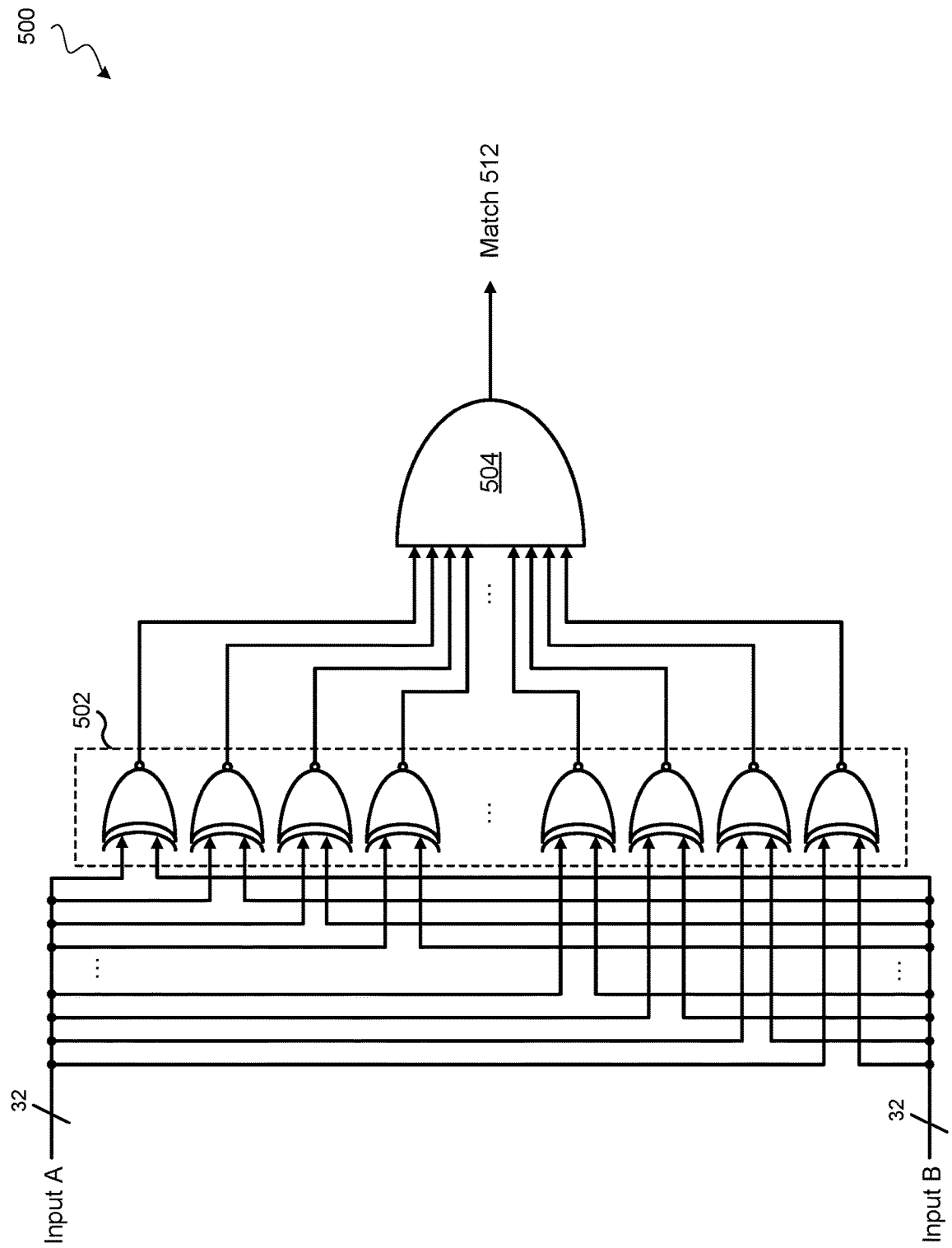
FIG. 5 illustrates a block diagram of an example of matching circuitry.

FIG. 5 illustrates an example of matching circuitry 500 that can be used to determine whether an input value matches the value stored in the feedback register of a pipeline stage. Each pipeline stage or computational circuit block is associated with its own matching circuitry 500. Hence, N number of matching circuitry 500 can be implemented for N number of pipeline stages or computational circuit blocks.

Matching circuitry 500 may include a set of XNOR gates 502 to perform a bit-wise XNOR operation on Input A and Input B. Input A may correspond, for example, to the first numeric input of the ALU circuit that receives an element of a tensor, and Input B may correspond, for example, to the second numeric input of the ALU circuit that receives the value stored in the feedback register. In the example shown, both inputs are 32-bit inputs (e.g., to support FP32 datatype), and thus the set of XNOR gates 502 may include 32 XNOR gates. Each XNOR gate performs a XNOR operation on one bit from Input A and the corresponding bit from Input B. For example, the first XNOR gate may perform a XNOR operation on bit 0 of Input A and bit 0 of Input B. If Input A matches Input B, each of the XNOR gates in set of XNOR gates 502 will output a logic 1. The outputs of the XNOR gates are fed to AND gate 504 to generate a match signal 512. When all the outputs of the XNOR gates are at logic 1, match signal 512 is asserted to indicate Input A matches Input B.

In some implementations, at least some of matching circuitry 500 can be implemented as part of the ALU circuit or part of the computational circuit block. For example, if the ALU already includes a bit-wise XNOR function, the logic can be reused to generate the match signal. The ALU circuit can be configured to perform the bit-wise XNOR function while passing through the first numeric input value. A bit-wise XOR function in the ALU circuit can also be reused for such purpose. Matching circuitry 500 can also be implemented external to the ALU circuit but be part of the computation circuit block, or be implemented external to the computational circuit block. It should be noted that matching circuitry 500 as shown in FIG. 5 is one example, and that other logic gates and/or circuitry can be used to implement the functionality of replacement circuitry 500 in other implementations.

Thus far, techniques to operate a computational pipeline of N stages to find the top N values and their corresponding indices have been described. To find the top M values and their corresponding indices in a tensor, where M is greater than N, the above techniques can be repeated with a modified tensor that replaces the top N values of the original input tensor with a minimum value (e.g., a value representing negative infinity). By performing the above techniques with the modified tensor, the next top N values and their indices can be found because the first top N values have been replaced by the minimum value. The process can be repeated for a number of iterations depending on the ratio of M to N.

Figure 6:
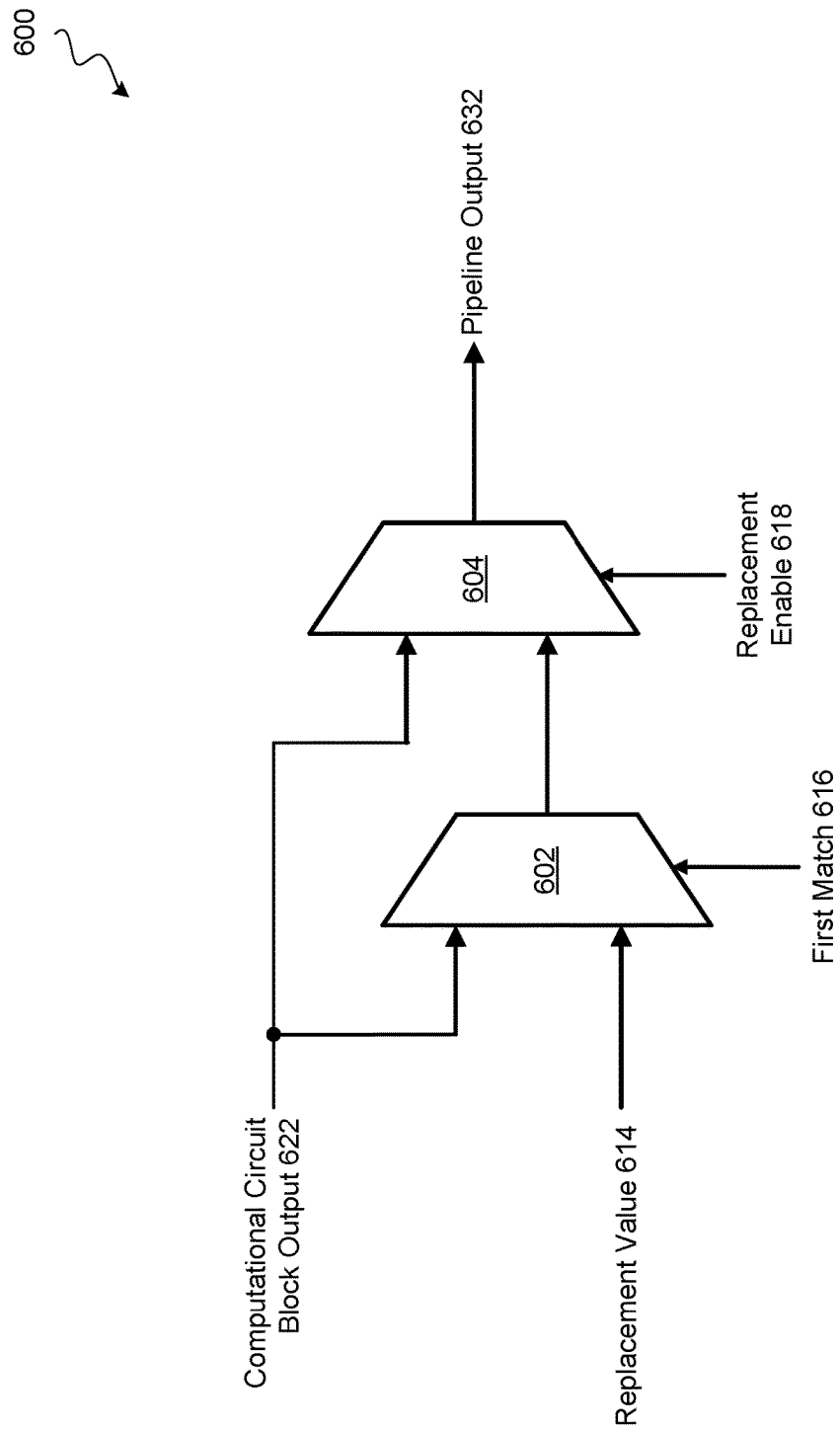
FIG. 6 illustrates a block diagram of an example of replacement circuitry.

The processing circuit can include replacement circuitry configured to substitute a replacement value for an input value being streamed into the pipeline that is a first match for a value stored in a feedback register. Referring to FIG. 6, the replacement circuitry may include, for example, a first multiplexer 602 and a second multiplexer 604. The first multiplexer 602 has a first input coupled to the computation circuit block output 622 of the last pipeline stage (which receives the input value being streamed into the pipeline) and a second input driven with a replacement value 614. The first multiplexer 602 can be controlled by a first match signal 616 (e.g., a logical OR of the first match signals 432), which indicates whether the input value streamed into the pipeline stage is a first match to a value stored in a feedback register. When a first match is found, the first multiplexer 603 outputs the replacement value 614.

The second multiplexer 604 has a first input coupled to computation circuit block output 622 of the last pipeline stage and a second input driven by the output of the first multiplexer 602. The second multiplexer 604 can be controlled by a replacement enable signal 618. When the replacement operation is being performed and replacement enable signal 618 is enabled, the second multiplexer 604 selects the output of the first multiplexer 602 as the primary result output 632. When the replacement operation is not being performed and the replacement enable signal 618 is disabled, the second multiplexer 604 selects the computation circuit block output 622 as the pipeline output 632. It should be noted that replacement circuitry 600 as shown in FIG. 6 is one example, and that other logic gates and/or circuitry can be used to implement the functionality of replacement circuitry 600 in other implementations.

To perform the replacement operation, the set of largest values or the top N values of the tensor are loaded into the feedback registers of the pipeline (if they are not already stored therein). In some implementations, the replacement value can be set to a minimum value such as a value representing negative infinity. Once the set of largest values to be replaced have been loaded into the feedback registers, the elements of the tensor can be streamed into the first numeric input of the first ALU stage along the ALU pipeline. This is done while the set of largest values of the tensor are stored in the feedback registers and the replacement circuitry is enabled. The replacement circuitry will passthrough any input values that does not match the values stored in the feedback registers, and substitute the first occurrence of the values to be replaced with the minimum value. In other words, for each element of the tensor being streamed into the pipeline, the replacement circuitry outputs the element when the element is not a first match to any value in the set of largest values of the tensor, and outputs the minimum value instead of the element when the element is the first match to a value in the set of largest values of the tensor. The output of the pipeline is stored as the modified tensor, which can be used as the input tensor for the next iteration.

Figure 7:
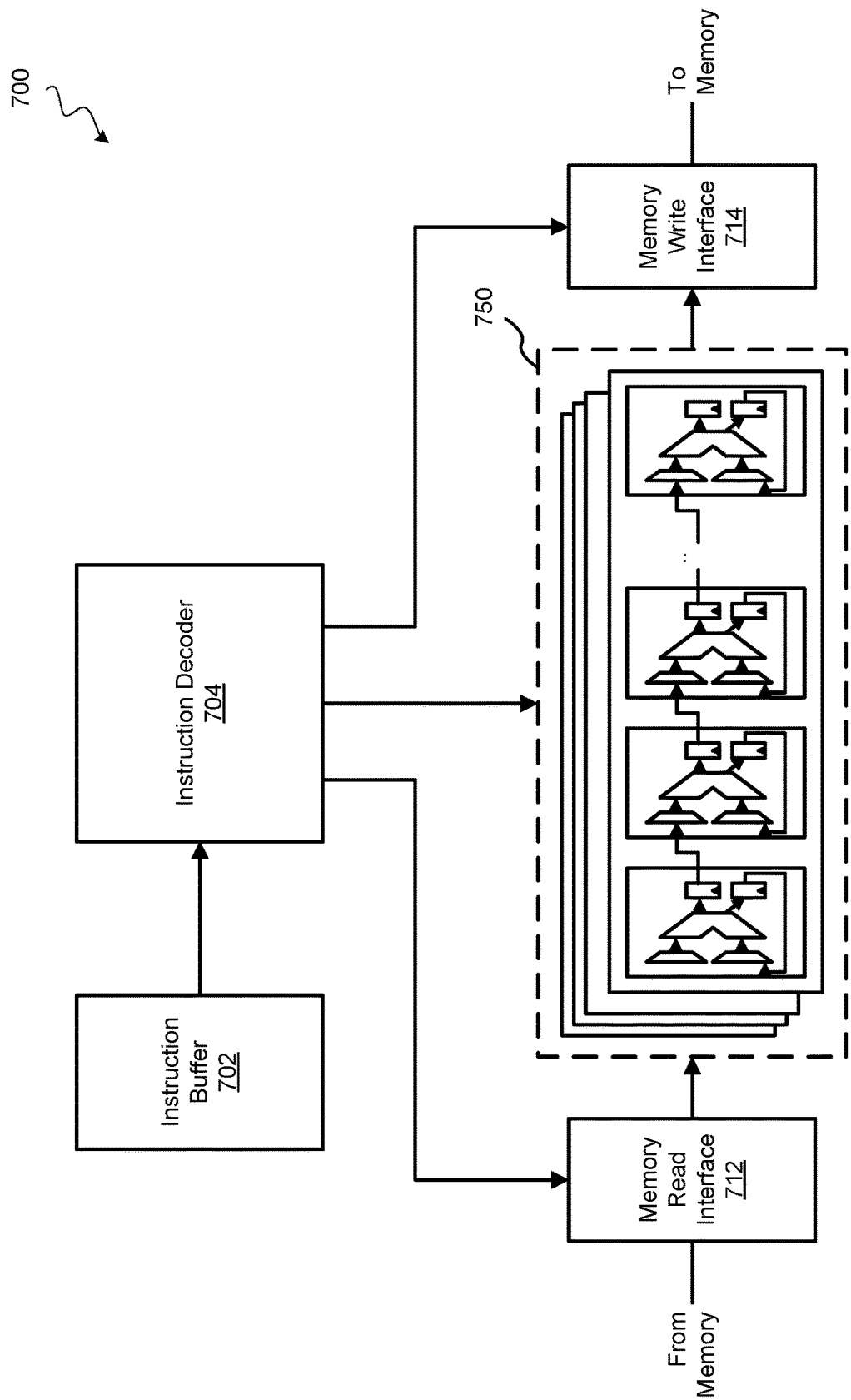
FIG. 7 illustrates a block diagram of an example of an execution engine.

FIG. 7 illustrates a block diagram of an example of an execution engine 700. Execution engine 700 can be part of a data processor (e.g., a data processing integrated circuit device such as a processor, a graphics processor, a digital signal processor, a tensor processor, a neural network accelerator, or other types of application specific integrated circuits). For example, execution engine 700 can be a vector engine or a pooling engine of a neural network accelerator.

Execution engine includes an instruction buffer 702, an instruction decoder 704, a memory read interface 712, a memory write interface 714, and a computational engine 750. Instruction buffer 702 stores a set of pending machine instructions that are executable by execution engine 700 to perform certain functions or operations. Instruction buffer 702 may include a set of entries in which each entry stores a single machine instruction. The machine instructions can be, for example, assembly-type instructions and can be part of an instruction set for the data processor architecture. Examples of instruction sets may include ARM instruction set, MIPS instruction set, x86 instruction set, or other types of proprietary instruction set tailored for a certain data processor architecture.

Instruction decoder 704 is configured to retrieve or obtain a machine instruction from instruction buffer 702, and includes instruction decoder circuitry to decode the machine instruction to determine the actions to be taken by execution engine 700. For example, instruction decoder 704 may decode a machine instruction to extract various fields including an opcode, and one or more operands (depending on the opcode) to allow execution engine 700 to perform the intended operations. In some implementations, instruction decoder 704 may decode a complex instruction into multiple opcodes and corresponding optional operands. Instruction decoder 704 may also drop or discard unrecognizable or invalid instructions.

The fields extracted by instruction decoder 704 can be used to lookup configuration profiles to program or configure computational engine 750 to perform certain functions. The extracted fields from the machine instruction may also identify locations in memory to retrieve data for computational engine 750 to process, and identify locations in memory to write the results outputted from computational engine 750. In some implementations, computational engine 750 may interface with one or more memories via memory read interface 712 and memory write interface 714. Computational engine 750 can be communicatively coupled between two memories, and may read from one memory and write to another, and/or read and write to the same memory. For example, in implementation in which execution engine 700 is a vector engine or a pooling engine, computational engine 750 may interface with a state buffer memory and a partial sum result buffer memory. Computational engine 750 may obtain data to process from either or both of these buffer memories via memory read interface 712, and may write the output to either or both of these buffer memories via memory write interface 714.

Computational engine 750 can include multiple execution channels to perform parallel data processing. Each of the execution channel can be implemented as a processing circuit with multiple computational circuit blocks coupled in series to form a pipeline. For example, in some implementations, an execution channel may include at least eight computational circuit blocks, and thus at least eight pipeline stages. Each of the computation circuit blocks includes a programmable ALU circuit that can be programmed to perform various functions depending on the machine instruction being executed by execution engine 700. The computation circuit block can be implemented using any of the computation circuit blocks described herein. Hence, each of the pipeline stage may include a feedback register to implement a feedback path that can be utilized to perform the subfunctions of a beam search operation. The beam search operation can be, for example, part of a neural network model implementing a natural language processing application, or other types of applications that perform sequence predictions.

To facilitate programming of computational engine 750 to perform a beam search operation, new machine instructions including a Max-N machine instruction, a Find-Index-N machine instruction, and a Match-Replace-N machine instruction are introduced, where N represents the number of pipeline stages (e.g., ALU stages) along an execution channel.

The Max-N machine instruction operates on a source tensor of variable length, and writes N number of elements containing the N largest values in the source tensor to a destination tensor in a sorted order. Hence, the Max-N machine instruction can be executed to obtain or find the N largest values in an input tensor. When the Max-N machine instruction is executed, the feedback registers of the ALUs of the execution channel can be initialized with a minimum value, and the ALUs can be programmed to perform a MIN function. The elements of an input tensor are then streamed into the pipeline of the execution channel to store the N largest values or the top N values of the input tensor in the feedback registers. In some implementations, a constant tensor (e.g., a set of minimum values) are then streamed into the pipeline of the execution channel to extract the N largest values from the feedback registers, which can be written to a destination tensor in memory. The N largest values may include duplicate values.

The Find-Index-N machine instruction operates on a first source tensor of variable length and a second source tensor having N number of values, and writes N number of elements to a destination tensor. The N number of elements contain indices indicating locations of the values of the second source tensor in the first source tensor. Hence, the Find-Index-N machine instruction can be executed to obtain indices of the input tensor corresponding to the N largest values. When the Find-Index-N machine instruction is executed, the N largest values found by the Max-N machine instruction can be loaded into the feedback registers of the ALUs of the execution channel. The ALUs can be programmed to perform a matching function, or the pipeline stages can use matching circuitry to find the first match of the values stored in the feedback registers. The elements of the input tensor are then streamed into the pipeline of the execution channel in parallel with corresponding indices of the elements of the input tensor while the N largest values of the tensor are stored in the feedback registers. For each element of the input tensor that is a first match to a value stored in the feedback registers, the corresponding index of that element is copied or written to an index register, and the contents of the index register can be written to a destination tensor in memory.

The Match-Replace-N machine instruction operates on a first source tensor of variable length, a second source tensor having N number of values, and a replacement value, and copies the first source tensor to a destination tensor while replacing a first occurrence of the values of the second source tensor in the first source tensor with the replacement value. Hence, the Match-Replace-N instruction can be executed to replace each of the N largest values of the input tensor with a minimum value (e.g., a value representing negative infinity) to generate a modified input tensor. When the Match-Replace-N machine instruction is executed, the N largest values found by the Max-N machine instruction can be loaded into the feedback registers of the ALUs of the execution channel. The ALUs can be programmed to perform a matching function, or the pipeline stages can use matching circuitry to find the first match of the values stored in the feedback registers. Replacement circuitry can be enabled to perform the replacement function. The elements of the input tensor are then streamed into the pipeline of the execution channel. For each element of the input tensor that is a first match to a value stored in the feedback registers, the element is replaced with a minimum value, and the output of the pipeline can be written to a destination tensor in memory.

Although the various machine instructions (e.g., Max-N, Find-Index-N, Match-Replace-N) have been described as supporting beam search operations, it should be understood that these machine instructions are not limited to beam search operations, and need not be executed together. Each machine instruction can be executed to support other types of operations. For example, the Max-N machine instruction can be executed to support a sorting operation. As another example, the Find-Index-N machine instruction can be executed to find the locations of certain values (not necessarily the top values) in a stream of numbers. As a further example, the Match-Replace-N machine instruction can be executed to replace selected values (not necessarily the top values) with a constant value.

Figure 8:
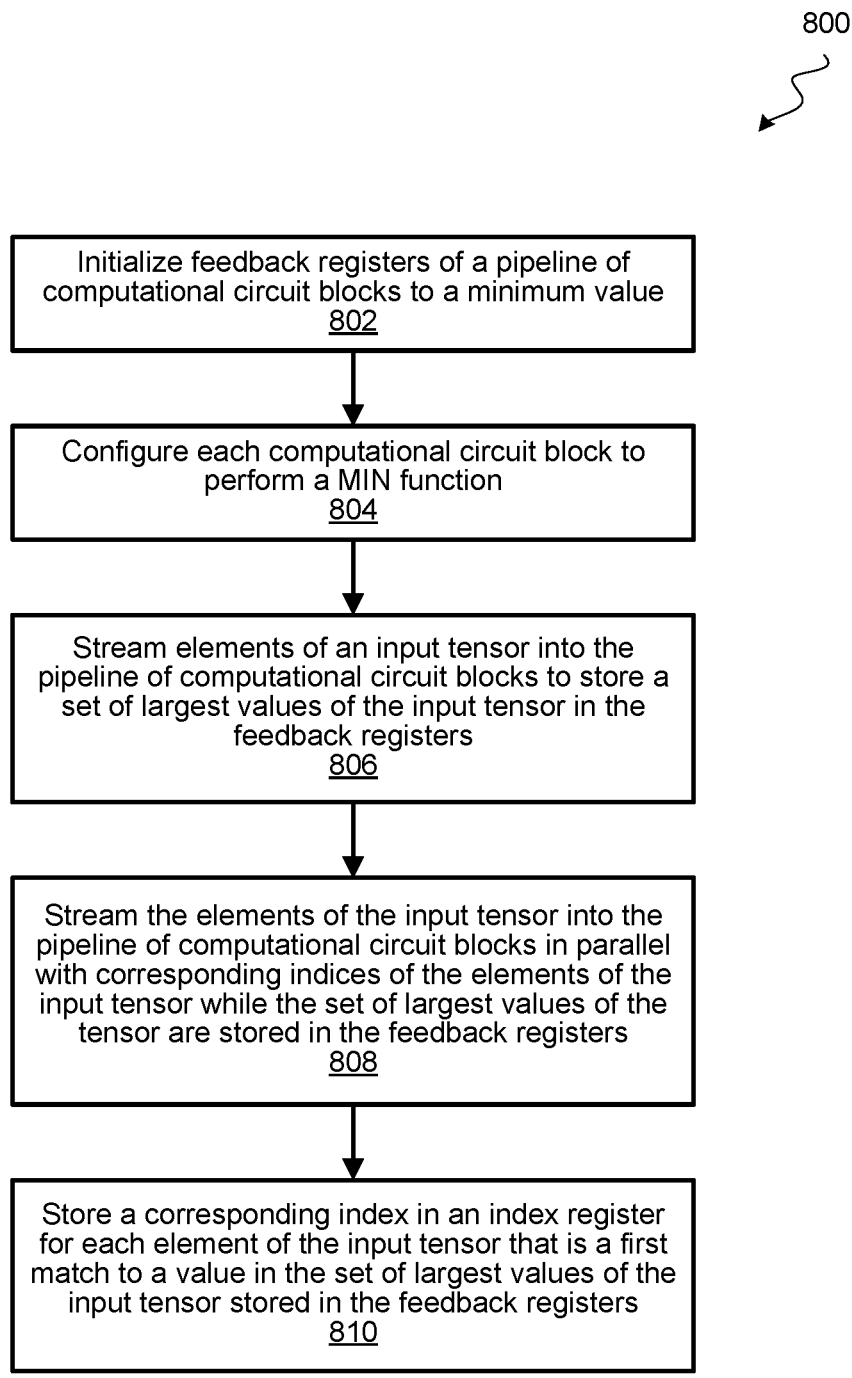
FIG. 8 illustrates a flow diagram of an example of a process to find a set of largest values in an input tensor and the indices of those values in the input tensor.

FIG. 8 illustrates a flow diagram of an example of a process 800 to find a set of largest values in an input tensor and the indices of those values in the input tensor. Process 800 can be performed, for example, by a processing circuit that includes a set of computational circuit blocks coupled in series to form a pipeline. Each of the computational circuit blocks can include an ALU circuit to perform a programmable arithmetic function.

Process 800 may begin at block 802 by initializing the feedback registers of a pipeline of computational circuit blocks to a minimum value. The minimum value can be a value representing negative infinity (e.g., when operating on signed floating-point numbers), zero (e.g., when operating on positive numbers), or a value representing the largest magnitude negative integer (e.g., when operating on signed integers), etc.

At block 804, each computational circuit block is configured to perform a minimum (MIN) function. For example, each computational circuit block can be programmed with an opcode representing the MIN function. The MIN function selects a minimum of a first numeric input and a second numeric input of the computational circuit block to provide on a primary result output of the computational circuit block. The MIN function also stores the unselected one of a first numeric input and a second numeric input in a corresponding feedback register of the computational circuit block. For example, the MIN function may output the unselected one of the numeric inputs on a secondary output that is coupled to the feedback register.

At block 806, the elements of an input tensor are streamed into the pipeline of computational circuit blocks to store a set of the largest values of the input tensor in the feedback registers. For example, the elements of the input tensor can be streamed into the first numeric input of the first pipeline stage. Each clock cycle may shift in a new element from the input tensor into the pipeline. As the elements of the input tensor are shifted into the pipeline, each computational circuit block will retain in the feedback register the larger of the input values presented to the computational circuit block. Upon completion of streaming the elements of the input tensor into the pipeline, the set of largest values of the tensor will be stored in the feedback registers.

At block 808, to obtain the indices of the values found at block 806, the elements of the input tensor can be streamed again into the pipeline of computational circuit blocks in parallel with corresponding indices of the elements of the input tensor, while the set of largest values of the input tensor are stored in the feedback registers. Each computational circuit block can be configured to identify a first match between an element of the input tensor and the value stored in the feedback register.

At block 810, a corresponding index of a matching element can be stored in an index register for each element of the input tensor that is a first match to a value in the set of largest values of the input tensor stored in the feedback registers. Upon completion of streaming the elements of the input tensor into the pipeline, the indices corresponding to the set of largest values of the tensor will be stored in the index register.

In some implementations, to obtain the set of largest values of the input tensor from the feedback registers, a constant tensor can be streamed into the pipeline of computational circuit blocks to output the values stored in the feedback register from the pipeline. For example, each computational circuit block can be configured to perform the MIN function, and a set of minimum values can be streamed into the pipeline to shift out the set of largest values of the input tensor from the feedback registers. Alternatively, each computational circuit block can be configured to perform a MAX function, and a set of maximum values can be streamed into the pipeline to shift out the set of largest values of the input tensor from the feedback registers.

In some implementations, to find the next set of largest values in the input tensor, each value in the set of largest values of the input tensor can be replaced with a minimum value to generate a modified input tensor. The elements of the modified input tensor can be streamed into the pipeline of computational circuit blocks according to blocks 802 to 810 above to find a next set of largest values and their corresponding indices.

Figure 9:
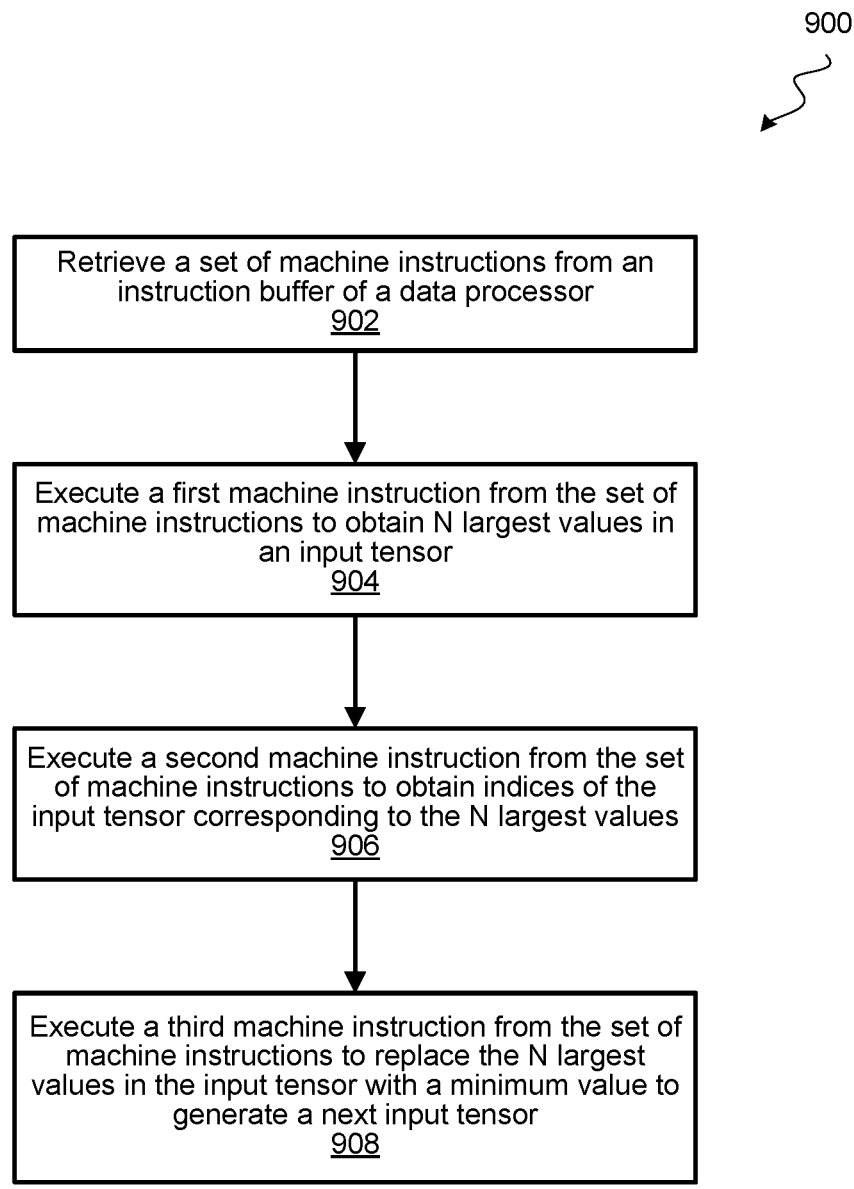
FIG. 9 illustrates a flow diagram of an example of a process to operate a data processor.

FIG. 9 illustrates a flow diagram of an example of a process 900 to operate a data processor. Process 900 can be performed, for example, by an execution engine of a data processor (e.g., a data processing integrated circuit device such as a processor, a graphics processor, a digital signal processor, a tensor processor, a neural network accelerator, or other types of application specific integrated circuits). The data processor may have an instruction buffer operable to store pending machine instructions, and an instruction decoder operable to decode machine instructions stored in the instruction buffer for execution. The execution engine can include a processing circuit having N number of pipelined ALU stages to execute the machine instructions.

At block 902, the data processor can retrieve a set of machine instructions from the instruction buffer of the data processor. In some implementations, the machine instructions can be retrieved one at a time, and be decoded for execution by the processing circuit. Each machine instruction may include configuration information to configure the processing circuit. For example, each machine instruction can be decoded to obtain an opcode to program the ALU stages to perform a certain function.

At block 904, the processing circuit may execute a first machine instruction from the set of machine instructions to obtain N largest values in an input tensor. The first machine instruction may operate on a source tensor (e.g., input tensor) of variable length, and writes N number of elements containing the N largest values in the source tensor to a destination tensor in a sorted order. An example of the first machine instruction can be a Max-N instruction.

At block 906, the processing circuit may execute a second instruction from the set of machine instructions on the input tensor to obtain indices corresponding to the N largest values in the input tensor. The second machine instruction may operate on a first source tensor (e.g., the input tensor) of variable length and a second source tensor having N number of values (e.g., the N largest values), and writes N number of elements to a destination tensor. The N number of elements contain indices indicating locations of the values of the second source tensor in the first source tensor. An example of the second machine instruction can be a Find-Index-N instruction.

At block 908, the processing circuit may execute a third instruction from the set of machine instructions on the input tensor to replace the N largest values in the input tensor with a minimum value to generate a next input tensor. The third machine instruction may operate on a first source tensor (e.g., the input tensor) of variable length, a second source tensor having N number of values (e.g., the N largest values), and a replacement value (e.g., a minimum value), and copies the first source tensor to a destination tensor while replacing a first occurrence of the values of the second source tensor in the first source tensor with the replacement value. An example of the third machine instruction can be a Match-Replace-N instruction.

Figure 10:
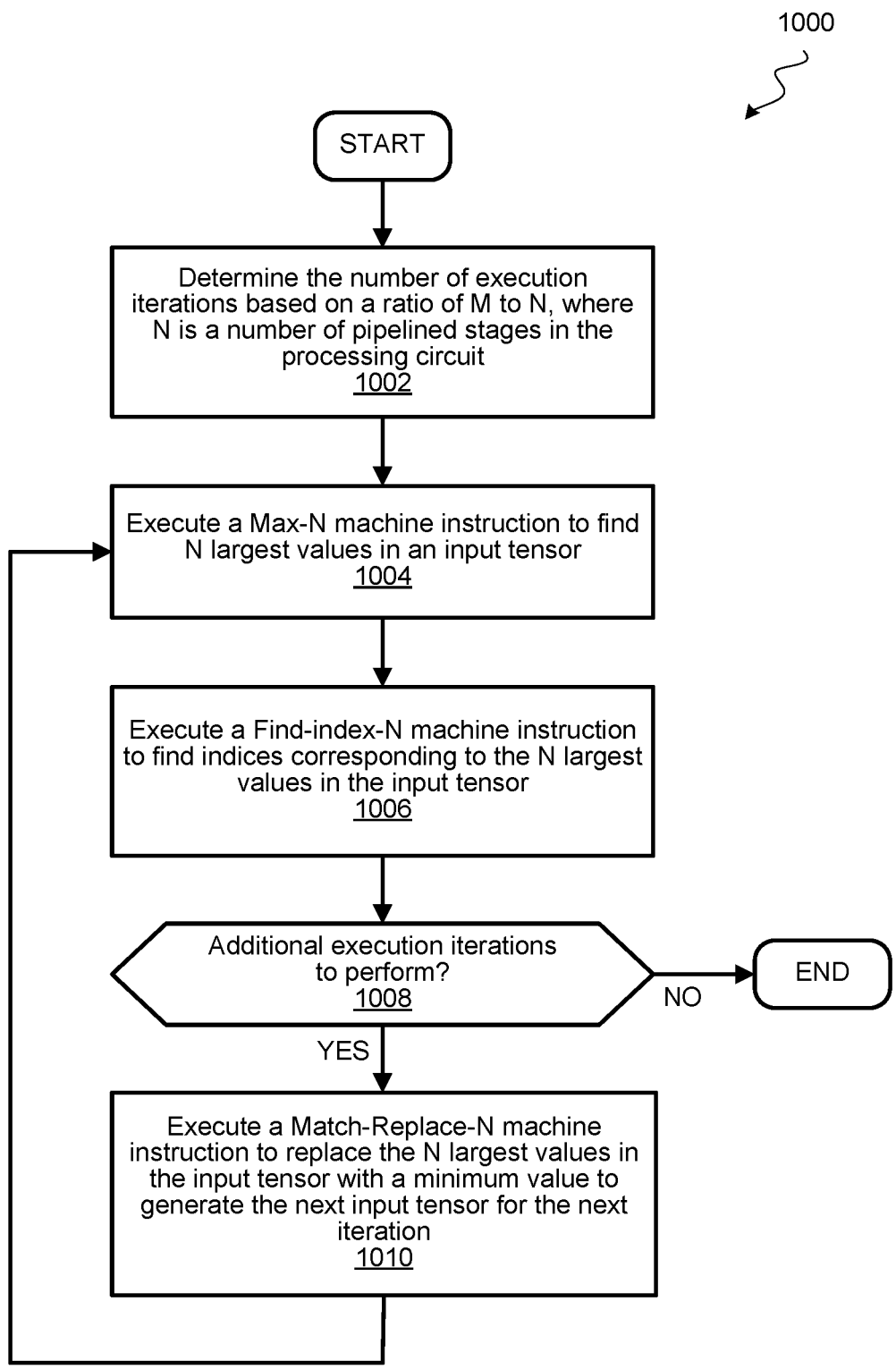
FIG. 10 illustrates a flow diagram of an example of a process to perform a beam search operation.

FIG. 10 illustrates a flow diagram of an example of a process 1000 to perform a beam search operation. Process 1000 can be performed, for example, a data processor (e.g., a data processing integrated circuit device such as a processor, a graphics processor, a digital signal processor, a tensor processor, a neural network accelerator, or other types of application specific integrated circuits). The data processor may receive a set of machine instructions to execute, in which the set of machine instructions includes a beam search operation to find M largest tensor values in a tensor.

The beam search operation of process 1000 may begin at block 1002 by determining the number of execution iterations to perform based on a ratio of M to N, where N is the number of pipelined stages (e.g., ALU stages) in the processing circuit of the data processor. For example, if the processing circuit has eight pipeline stages (N=8), and the beam search operation is to find M=20 largest tensor values, then the number of execution iterations is determined to be 3 because it will take three iterations of finding eight values to obtain the twenty largest values.

At block 1004, process 1000 begins to execute the number of execution iterations by executing a Max-N machine instruction to find N largest values in an input tensor. For example, when the Max-N machine instruction is executed, the feedback registers of the ALU stages of the pipeline can be initialized with a minimum value, and the ALU stages can be programmed to perform a MIN function. The elements of an input tensor are then streamed into the pipeline of the to store the N largest values or the top N values of the input tensor in the feedback registers. In some implementations, a constant tensor (e.g., a set of minimum values) are then streamed into the pipeline of the execution channel to extract the N largest values from the feedback registers. The N largest values may include duplicate values.

At block 1006, a Find-Index-N machine instruction is executed to find indices corresponding to the N largest values in the input tensor. For example, when the Find-Index-N machine instruction is executed, the N largest values found by the Max-N machine instruction at block 1004 can be loaded into the feedback registers of the ALU stages. The ALU stages can be programmed to perform a matching function, or the ALU stages can use matching circuitry to find the first match of the values stored in the feedback registers. The elements of the input tensor are then streamed into the pipeline in parallel with corresponding indices of the elements of the input tensor. For each element of the input tensor that is a first match to a value stored in the feedback registers, the corresponding index of that element is copied or written to an index register.

At block 1008, a determination is made as to whether there are additional execution iterations to perform. If the M number of requisite top values have been found, the bean search operation of process 1000 can be terminated, and the data processor can move on to perform other operations. If there are pending execution iterations to perform (e.g., there are additional top values to find), process 1000 proceeds to block 1010.

At block 1010, a Match-Replace-N machine instruction is executed to replace the N largest values in the input tensor with a minimum value to generate the next input tensor for the next iteration. When the Match-Replace-N machine instruction is executed, the N largest values found by the Max-N machine instruction at block 1004 can be loaded into the feedback registers of the ALU stages. The ALU stages can be programmed to perform a matching function, or the pipeline stages can use matching circuitry to find the first match of the values stored in the feedback registers. Replacement circuitry can be enabled to perform the replacement function. The elements of the input tensor are then streamed into the pipeline. For each element of the input tensor that is a first match to a value stored in the feedback registers, the element is replaced with a minimum value, and the output of the pipeline can be stored as the input tensor for the next iteration. Process 1000 then returns to block 1004 to find the next N number of largest values. It should be noted that blocks 1004 and 1006 can be performed for each iteration of the execution iterations, and block 1010 can be performed for each iteration except for the last iteration of the execution iterations.

Figure 11:
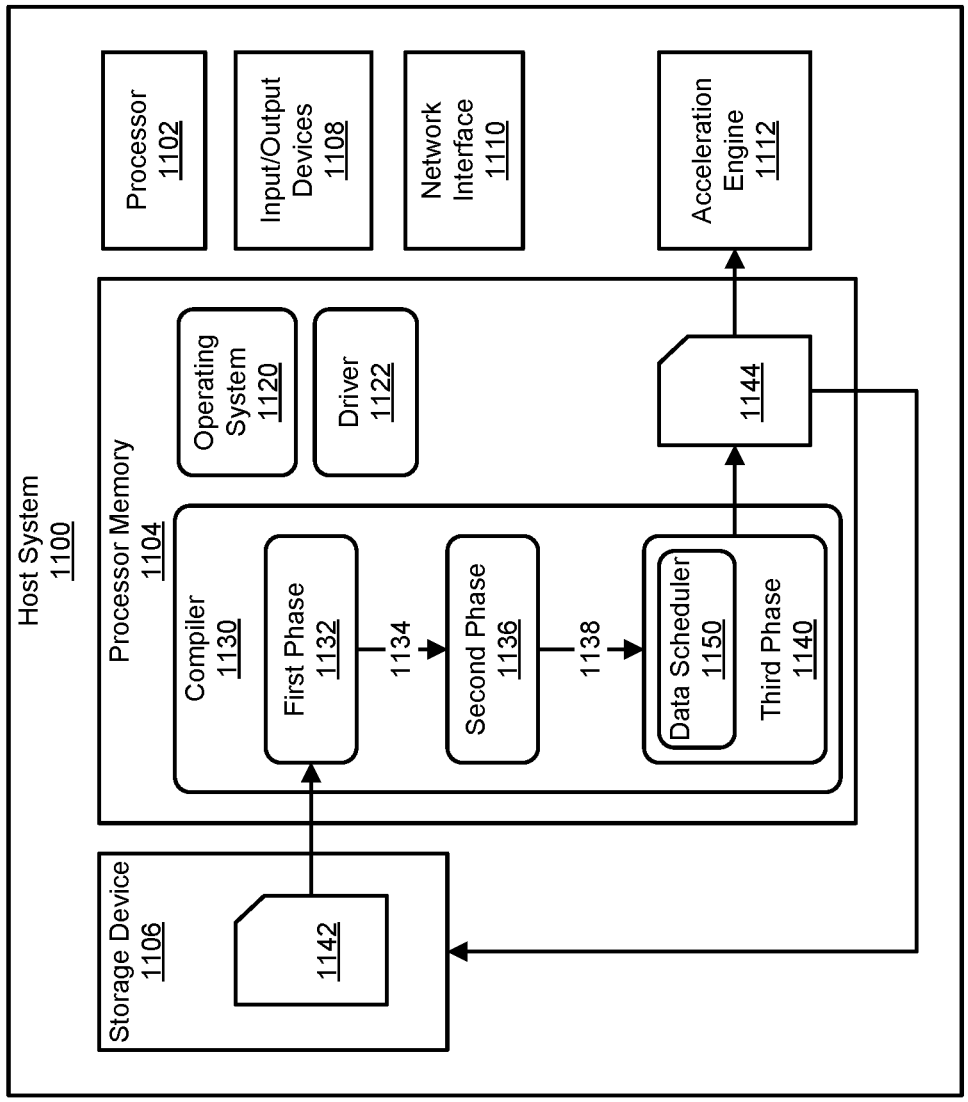
FIG. 11 illustrates a block diagram of an example of a compiler in a host system.

FIG. 11 includes a block diagram illustrating an example of a host system 1100 on which a compiler 1130, such as is described herein, can run. The illustrated host system 1100 is an example of a computing device, and includes a processor 1102, a processor memory 1104, at least one storage device 1106, various Input/Output (I/O) devices 1108, and at least one network interface 1110. In the example of FIG. 11, the host system 1100 also includes an acceleration engine 1112, which is an integrated circuit device that can accelerate certain operations or computations performed by the host system 1100. In various examples, the host system 1100 can be implemented as a server in a data center, a desktop computer, a laptop computer, a tablet computer, or a smartphone, among other examples. In some examples, operations or components discussed below as being performed or included in the host system 1100 can be performed or included in other computer devices. For example, the compiler 1130 can execute on the host system 1100 while the acceleration engine 1112 is located at a different host system.

The processor 1102 is an integrated circuit device that can execute program code, in the form of instructions. The program code can be for various software applications or tools, such as an operating system 1120 or the illustrated compiler 1130. While the processor 1102 is executing a program, the instructions for the program can be stored in the processor memory 1104. The instructions can also be stored elsewhere, such as on the storage device 1106, and can be loaded into the processor memory 1104 when needed by the processor 1102. The processor 1102 can also use the processor memory 1104 for temporary storage of other data on which the processor 1102 is operating. In various examples, the processor memory 1104 is a volatile memory type, such as a type of Random Access Memory, though non-volatile memory types can, alternatively or additionally, be used for the processor memory 104.

The storage device 1106 is an example of a device that can include non-volatile memory. For example, the storage device 1106 can be a magnetic disk drive, a solid-state drive, or an optical drive, among other examples. The storage device 1106 can further be non-transitory, such that program code and other data stored on the storage device 1106 remains present when the storage device 106 is not powered on.

The storage device 1106 is one example of a peripheral device, which are components that can be coupled to the host system 1100 to add functionality to the host system 1100. Other examples of peripheral devices include the Input/Output devices 1108 and the network interface 1110. The Input/Output devices 1108 can include user input and output devices, such as keyboards, mice, touch screens, microphones, display screens, speakers, printers, and scanners, among other examples. The network interface 1110, which can be implemented using a network interface card, can provide access to one or more networks. The network interface 1110 can include, for example, a physical port for connecting a network cable and/or wireless antennas for communicating with Wi-Fi and/or cellular networks. The network interface 1110 can also be described as an I/O device.

The acceleration engine 1112 is also another type of peripheral device or I/O device. The acceleration engine 1112 is a device that is purpose-built to perform certain operations that can be performed by the processor 1102, but can be performed faster by the acceleration engine 1112. For example, the acceleration engine 1112 can be a neural network accelerator, and, as such, may be able to perform the large scale, parallel computations of a neural network more efficiently than when the computations are performed by the processor 1102. As another example, the acceleration engine 1112 can be a graphics processing unit (GPU), and may be optimized to perform the computations needed for graphics rendering. Other examples of devices that can be implemented by the acceleration engine 1112 include cryptographic accelerators, compression and decompression accelerators, 3-D accelerators, regular expression accelerators, security accelerators, and others.

In various examples, the acceleration engine 1112 can execute program code to perform certain operations. For example, when the acceleration engine 1112 is a neural network accelerator, the acceleration engine 1112 can be programmed to execute a particular neural network, such as one that performs image recognition or one that performs machine translation. As a further example, to support the execution of a neural network, the acceleration engine 1112 can be programed to perform operations such as copying data for the neural network from processor memory 1104 (for example) into the acceleration engine 1112, copying input data for the neural network from processor memory 1104 into the acceleration engine 1112, and/or copying results from the acceleration engine 1112 into the processor memory 1104, among other examples.

To generate program code for the acceleration engine 1112, in various examples, the host system 1100 can execute the compiler 1130. Compilers, in general, are software programs that translate program code written in a human-readable language into a format (e.g., machine instructions) that can be read and processed by an integrated circuit device. In the example of FIG. 11, the acceleration engine 1112 is a neural network accelerator and the compiler 1130 is for compiling a neural network description into instructions to be executed by the acceleration engine 1112. When the acceleration engine 1112 implements a different type of accelerator, another compiler can be used.

The compiler 1130 can be activated, for example, when the operating system 1120 receives keyboard, mouse, touchscreen, voice commands, or other inputs from the Input/Output devices 1108. The inputs can further include parameters for the compiler 1130, such as the input code 1142 to compile and configuration options for the compilation process. Once the compiler 1130 is activated, the processor 1102 can load the instructions for the compiler 1130 into the processor memory 1104, and can execute the instructions.

In the example of FIG. 11, the compiler 1130 includes a first stage 1132, a second stage 1136, and a third stage 1140, which each perform different operations to produce compiled code 1144. In other examples, the compiler 1130 can combine the operations of the first stage 1132, second stage 1136, and/or third stage 1140 into fewer stages, or can divide the operations of one of the stages into multiple stages.

The first stage 1132 can receive and process input code 1142. The input code 1142 can describe a program in a high-level programming language, such as Java, C++, or Tensorflow, among many other examples. The input code 1142 can describe, for example, steps to perform image recognition, speech recognition, machine translation, or other operations. The input code 1142 can be obtained, for example, from the storage device 1106. Alternatively, though not illustrated here, the input code 1142 may be located in the processor memory 1104 or can be obtained from a network location, using the network interface 1110. Processing of the input code 1142 can include sorting the operations described in the input code 1142 into layers, where the outputs of one layer provide the inputs to a next layer. Processing can also include identifying steps to be performed by the processor 1102, rather than by the acceleration engine 1112. For example, the processor 1102, through the execution of a driver 1122, may need to perform steps such as configuring Direct Memory Access (DMA) descriptors for moving data into or out of the acceleration engine 1112, among other examples.

The output 1134 of the first stage 1132 can be organized, for example, in the layers, nodes, and connections between nodes of a neural network. The second stage 1136 can perform intermediate processing on this output 1134. For example, the operations performed in any one layer, or at any one node in a layer, may be too many for the acceleration engine 1112 to perform at the same time. The acceleration engine 1112 may, for example, have a limited amount of locale storage space for the data needed for a computation, or the computations may be more than the acceleration engine 1112 can perform at one time. In this example, the first stage 1132 can break the operations of the layer or node down into smaller operations, which can fit into the acceleration engine's local memory and/or can fit into the computing capacity of the acceleration engine 1112. Processing of the output 1134 of the first stage 1132 can include other steps, such as scheduling, or determining the order in which the acceleration engine 1112 and/or processor 1102 will perform operations, among other examples.

In various examples, the output 1138 of the second stage 1136 includes the various steps to be performed by components of the acceleration engine 1112, in the order that the steps are to be performed. The output 1138 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 1140 can operate on the output 1138 of the second stage 1136, and perform various steps before producing the instructions that are to be executed by the acceleration engine 1112. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 1140 can include a data scheduler 1150 to determine the order in which instructions are executed by the acceleration engine 1112.

The output of the third stage 1140 is compiled code 1144, which may include machine instructions in binary format. In some examples, the compiled code 1144 can be stored in the processor memory 104. Alternatively or additionally, the compiled code 1144 can be copied to the storage device 1106 or to a network location. As noted above, the acceleration engine 1112 may be located at a different host system, in which case the compiled code 1144 can be sent over the network interface 1110 to the other host system.

In the example of FIG. 11, the host system 1100 can be executing a driver 1122, which can also be referred to as a device driver or runtime driver, that manages the acceleration engine 1112. The driver 1122 can provide an interface between applications executing on the host system 1100 (or on another host system) and the acceleration engine 1112. For example, the driver 1122 can provide an Application Program Interface (API) that defines functions for feeding input data to the acceleration engine 1112 and defining the operation to perform on the input data. In this and other examples, the driver 1122 can configure the acceleration engine 1112 to perform the operation. For example, the driver 1122 can identify a neural network that the acceleration engine 1112 is to execute, as well as the location in the processor memory 1104 or on the storage device 1106 where the compiled code 1144 for the neural network is located. The driver 1122 can further load into the acceleration engine 1112 or cause the acceleration engine 1112 to load the compiled code 1144, can load or cause the acceleration engine 1112 to load the input data on which the neural network is to operate, and/or can cause the acceleration engine 1112 to being executing on the input data. Once the acceleration engine 1112 has finished, the acceleration engine 1112 can notify the driver 1122, and the driver 1122 can deliver a result back to the application that requested the result.

Figure 12:
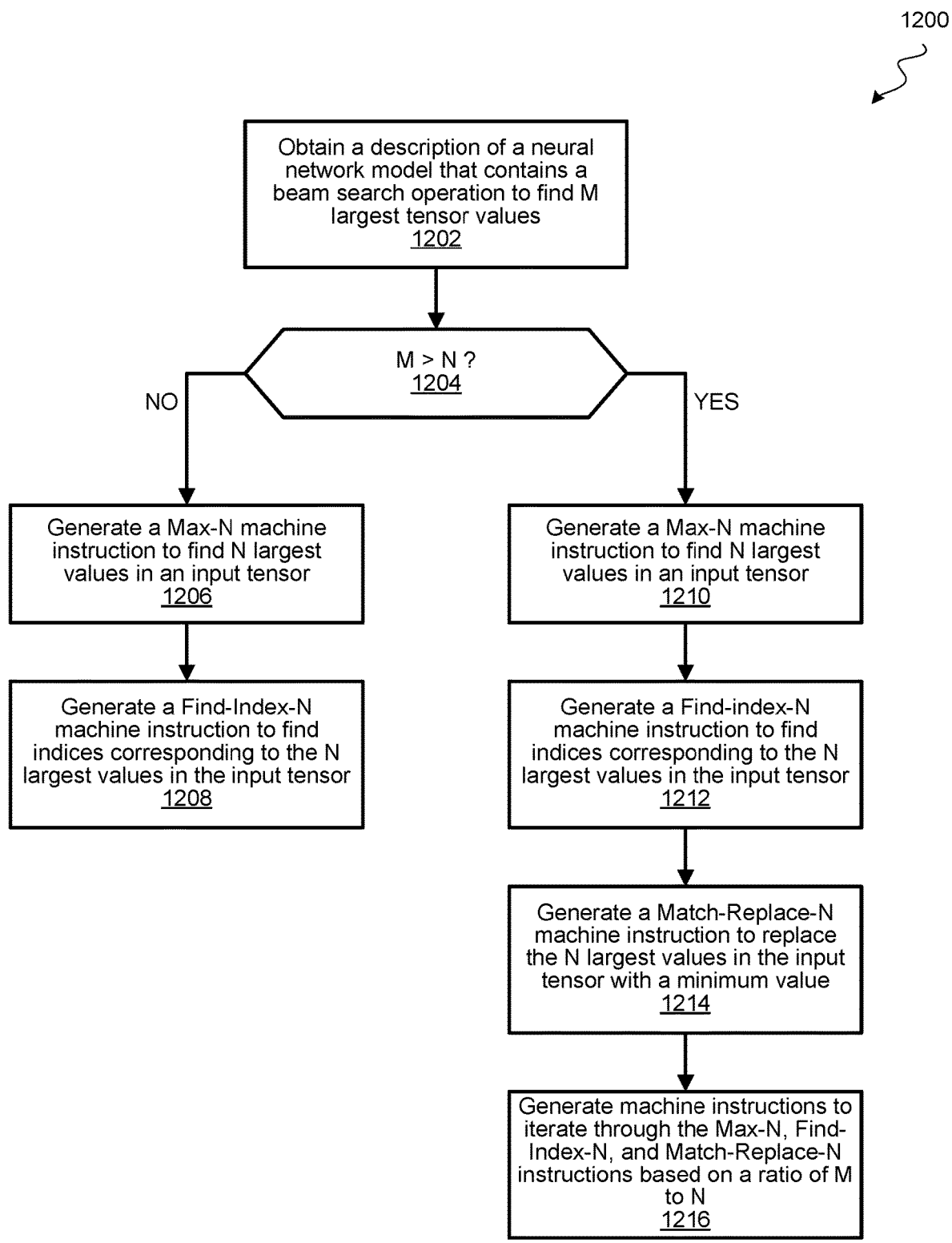
FIG. 12 illustrates a flow diagram of an example of a process to generate machine instructions.

FIG. 12 illustrates a flow diagram of a process 1200 for generating machine instructions to perform a beam search operation. Process 1200 can be performed, for example, by a compiler that interprets programming code describing a neural network model, and translates the programming code into machine instructions for execution on hardware. In some implementations, process 1200 can be implemented on a computer-readable medium that is executable by a processor of a computing system to compile the programming code of neural network model for loading onto a data processor for execution.

Process 1200 may begin at block 1202 by obtaining a description of the neural network model that contains a beam search operation to find M number of largest values in a tensor (e.g., beam width of M). The description of the neural network model can be, for example, in a programming language such as Java, C++, or Tensorflow, among many other examples. A representation of the directed acyclic hypergraph can be generated based on the computations and data flow provided in the description of the neural network model.

At block 1204, a determination is made as to whether M is greater than N, where N is a parameter indicating the capability of the hardware performing the beam search operation. For example, N can represent the number of top values that the hardware can obtain by streaming an input tensor once into a vector engine. In some implementations, N can be the number of pipeline stages in the vector engine.

If it is determined that M is not greater than N, meaning that the beam search operation can be performed in one pass of the tensor, then process 1200 proceeds to block 1206 to generate a Max-N machine instruction to find N largest values in an input tensor. The Max-N machine instruction may operate on a source tensor (e.g., input tensor) of variable length, and writes N number of elements containing the N largest values in the source tensor to a destination tensor in a sorted order.

At block 1208, process 1200 generates a Find-Index-N machine instruction to find indices corresponding to the N largest values in the input tensor. The Find-Index-N machine instruction may operate on a first source tensor (e.g., the input tensor) of variable length and a second source tensor having N number of values (e.g., the N largest values), and writes N number of elements to a destination tensor. The N number of elements contain indices indicating locations of the values of the second source tensor in the first source tensor. The generated instructions can then be stored as part of the compiled code for a neural network model for loading onto a data processor.

If it is determined that M is greater than N, then process 1200 proceeds to block 1210 to generate a Max-N machine instruction to find N largest values in an input tensor, and then to block 1212 to generate a Find-Index-N machine instruction to find indices corresponding to the N largest values in the input tensor. In addition to generating the Max-N and Find-Index-N machine instructions, at block 1214, a Match-Replace-N machine instruction is generated to replace the N largest values in the input tensor with a minimum value. The Match-Replace-N machine instruction may operate on a first source tensor (e.g., the input tensor) of variable length, a second source tensor having N number of values (e.g., the N largest values), and a replacement value (e.g., a minimum value), and copies the first source tensor to a destination tensor while replacing a first occurrence of the values of the second source tensor in the first source tensor with the replacement value.

Process 1200 then proceeds to block 1216 to generate machine instructions to iterate through the Max-N, Find-Index-N, and Match-Replace-N instructions based on a ratio of M to N. For example, if the number of iterations is low, additional Max-N, Find-Index-N, and Match-Replace-N machine instructions can be generated. Process 1200 may also generate jump machine instructions to loop through the machine instructions generated at blocks 1210 to 1214 to implement the number of requisite iterations to find the top M values. The generated instructions can then be stored as part of the compiled code for a neural network model for loading onto a data processor.

Figure 13:
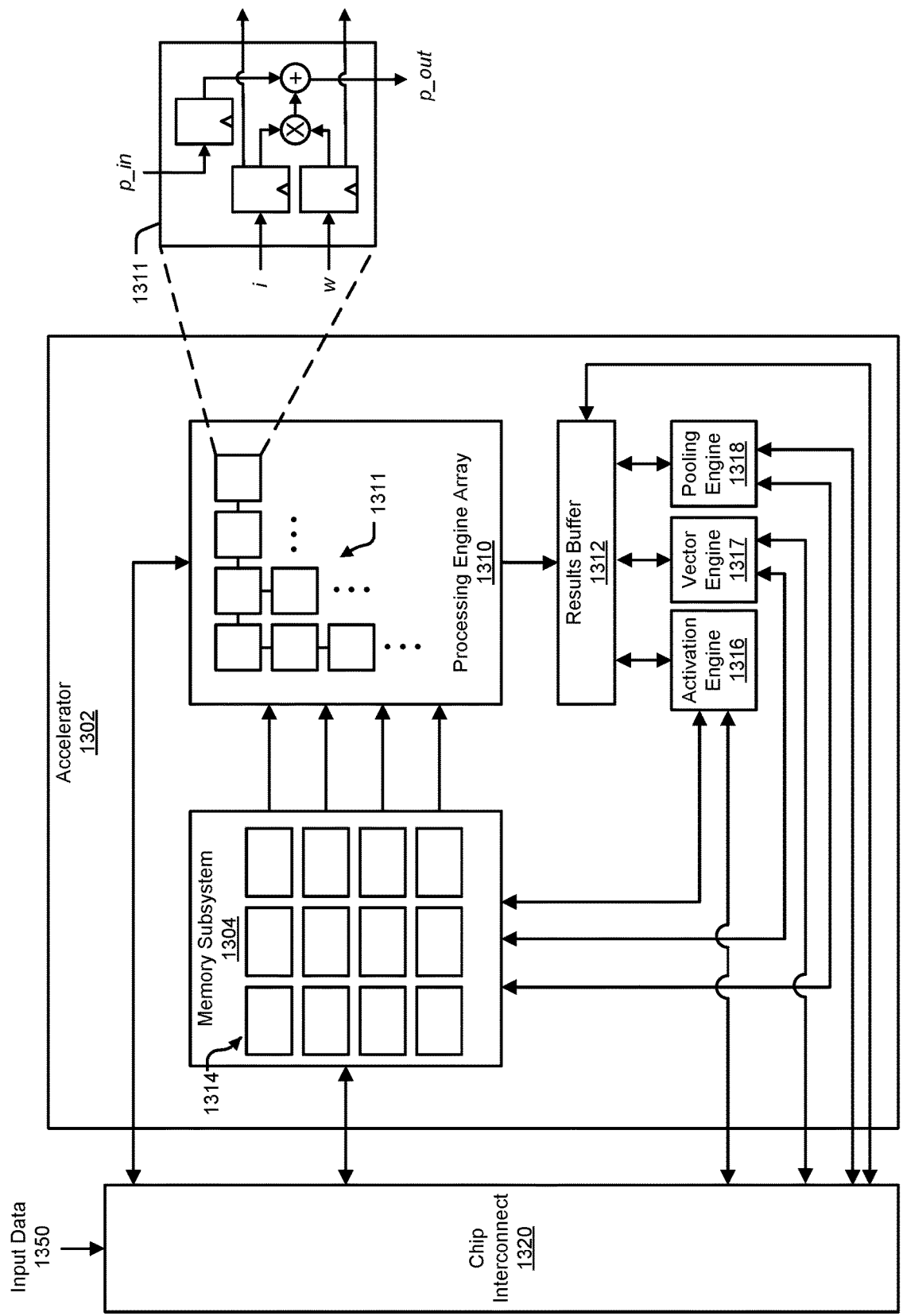
FIG. 13 illustrates a block diagram of an example of an integrated circuit device.

FIG. 13 is a block diagram illustrating an example of an integrated circuit device that can include an execution engine with native hardware support for the subfunctions of a beam search operation. The example of FIG. 13 illustrates an accelerator 1302. In various examples, the accelerator 1302, for a set of input data (e.g., input data 1350), can execute computations using a processing engine array 1310, an activation engine 1316, a vector engine 1317, and/or a pooling engine 1318. In some examples, the example accelerator 1302 may be an integrated circuit component of a processor, such as a neural network processor. The processor may have other integrated circuit components, including additional accelerator engines.

In various implementations, the memory subsystem 1304 (may also be referred to as a state buffer) can include multiple memory banks 1314. In these implementations, each memory bank 1314 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 1314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 1304 can permit simultaneous access to the read or write channels of multiple memory banks. As another example, the memory subsystem 1304 can include arbitration logic such that arbitration between, for example, the outputs of multiple memory banks 1314 can result in more than one memory bank's output being used. In these and other examples, though globally managed by the memory subsystem 1304, each memory bank can be operated independently of any other.

Having the memory banks 1314 be independently accessible can increase the efficiency of the accelerator 1302. For example, values can be simultaneously read and provided to each row of the processing engine array 1310, so that the entire processing engine array 1310 can be in use in one clock cycle. As another example, the memory banks 1314 can be read at the same time that results computed by the processing engine array 1310 are written to the memory subsystem 1304. In contrast, a single memory may be able to service only one read or write at a time. With a single memory, multiple clock cycles can be required, for example, to read input data for each row of the processing engine array 1310 before the processing engine array 1310 can be started.

In various implementations, the memory subsystem 1304 can be configured to simultaneously service multiple clients, including the processing engine array 1310, the activation engine 1316, the vector engine 1317, the pooling engine 1318, and any external clients that access the memory subsystem 1304 over a communication fabric 1320. In some implementations, being able to service multiple clients can mean that the memory subsystem 1304 has at least as many memory banks as there are clients. In some cases, each row of the processing engine array 1310 can count as a separate client. In some cases, each column of the processing engine array 1310 can output a result, such that each column can count as a separate write client. In some cases, output from the processing engine array 1310 can be written into the memory banks 1314 that can then subsequently provide input data for the processing engine array 1310. As another example, the activation engine 1316, the vector engine 1317, and the pooling engine 1318 can include multiple execution channels, each of which can be separate memory clients. The memory banks 1314 can be implemented, for example, using static random access memory (SRAM).

In various implementations, the memory subsystem 1304 can include control logic. The control logic can, for example, keep track of the address spaces of each of the memory banks 1314, identify memory banks 1314 to read from or write to, and/or move data between the memory banks 1314. In some implementations, memory banks 1314 can be hardwired to particular clients. For example, a set of memory banks 1314 can be hardwired to provide values to the rows of the processing engine array 1310, with one memory bank servicing each row. As another example, a set of memory banks can be hard wired to receive values from columns of the processing engine array 1310, with one memory bank receiving data for each column.

The processing engine array 1310 is the computation matrix of the example accelerator 1302. The processing engine array 1310 can, for example, execute parallel integration, convolution, correlation, and/or matrix multiplication, among other things. The processing engine array 1310 includes multiple processing engines 1311, arranged in rows and columns, such that results output by one processing engine 1311 can be input directly into another processing engine 1311. Processing engines 1311 that are not on the outside edges of the processing engine array 1310 thus can receive data to operate on from other processing engines 1311, rather than from the memory subsystem 1304.

In various examples, the processing engine array 1310 uses systolic execution, in which data arrives at each processing engine 1311 from different directions at regular intervals. In some examples, input data can flow into the processing engine array 1310 from the left and weight values can be loaded at the top. In some examples weights and input data can flow from the left and partial sums can flow from top to bottom. In these and other examples, a multiply-and-accumulate operation moves through the processing engine array 1310 as a diagonal wave front, with data moving to the right and down across the array. Control signals can be input at the left at the same time as weights, and can flow across and down along with the computation.

In various implementations, the number of columns in the processing engine array 1310 determines the computational capacity of the processing engine array 1310, and the number of rows determines the required memory bandwidth for achieving maximum utilization of the processing engine array 1310. The processing engine array 1310 can have, for example, 64 columns and 428 rows, or some other number of columns and rows.

An example of a processing engine 1311 is illustrated in FIG. 13 in an inset diagram. As illustrated by this example, a processing engine 1311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 1311.

In the illustrated example, an input from above can include a partial sum, p_in, provided either from another processing engine 1311 or from a previous round of computation by the processing engine array 1310. When starting a computation for a new set of input data, the top row of the processing engine array 1310 can receive a fixed value for p_in, such as zero. As illustrated by this example, i and w are multiplied together and the result is summed with p_in to produce a new partial sum, p_out, which can be input into another processing engine 1311. Various other implementations of the processing engine 1311 are possible.

Outputs from the last row in the processing engine array 1310 can be temporarily stored in the results buffer 1312. The results can be intermediate results, which can be written to the memory banks 1314 to be provided to the processing engine array 1310 for additional computation. Alternatively, the results can be final results, which, once written to the memory banks 1314 can be read from the memory subsystem 1304 over the communication fabric 1320, to be output by the system.

In some implementations, the accelerator 1302 includes an activation engine 1316. In these implementations, the activation engine 1316 can combine the results from the processing engine array 1310 into one or more output activations. For example, for a convolutional neural network, convolutions from multiple channels can be summed to produce an output activation for a single channel. In other examples, accumulating results from one or more columns in the processing engine array 1310 may be needed to produce an output activation for a single node in the neural network. In some examples, activation engine 1316 can be bypassed.

In various examples, the activation engine 1316 can include multiple separate execution channels. In these examples, the execution channels can correspond to the columns of the processing engine array 1310, and can perform an operation on the outputs of a column, the result of which can be stored in the memory subsystem 1304. In these examples, the activation engine 1316 may be able to perform between 1 and n parallel computations, where n is equal to the number of columns in the processing engine array 1310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 1302 can include a pooling engine 1318. Pooling is the combining of outputs of the columns of the processing engine array 1310. Combining can include for example, computing a maximum value, a minimum value, an average value, a median value, a summation, a multiplication, or another logical or mathematical combination. In various examples, the pooling engine 1318 can include multiple execution channels that can operating on values from corresponding columns of the processing engine array 1310. In these examples, the pooling engine 1318 may be able to perform between 1 and n parallel computations, where n is equal to the number of columns in the processing engine array 1310. In various examples, execution channels of the pooling engine 1318 can operate in parallel and/or simultaneously. In some examples, the pooling engine 1318 can be bypassed.

In some implementations, the accelerator 1302 can further include a vector engine 1317. Vector engine 1317 is a compute engine that can perform computations and manipulations on values stored in memory subsystem 1304 and/or results buffer 1312 such as values representing matrices of input values, weight values, intermediate results, etc. Vector engine 1317 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 1317 can operate in parallel and/or simultaneously. In some examples, the vector engine 1317 can be bypassed or be omitted.

Herein, the activation engine 1316, the vector engine 1317, and the pooling engine 1318 may be referred to collectively as execution engines. The processing engine array 1310 is another example of an execution engine. Another example of an execution engine is a Direct Memory Access (DMA) engine, which may be located outside the accelerator 1302.

Input data 1350 can arrive over the communication fabric 1320. The communication fabric 1320 can connect the accelerator 1302 to other components of a processor, such as a DMA engine that can obtain input data 1350 from an Input/Output (I/O) device, a storage drive, or a network interface. The input data 1350 can be, for example one-dimensional data, such as a character string or numerical sequence, or two-dimensional data, such as an array of pixel values for an image or frequency and amplitude values over time for an audio signal. In some examples, the input data 1350 can be three-dimensional, as may be the case with, for example, the situational information used by a self-driving car or virtual reality data. In some implementations, the memory subsystem 1304 can include a separate buffer for the input data 1350. In some implementations, the input data 1350 can be stored in the memory banks 1314 when the accelerator 1302 receives the input data 1350.

In some examples, the accelerator 1302 can implement a neural network processing engine. In these examples, the accelerator 1302, for a set of input data 1350, can execute a neural network to perform a task for which the neural network was trained. Executing a neural network on a set of input data can be referred to as inference or performing inference.

The weights for the neural network can be stored in the memory subsystem 1304, along with input data 1350 on which the neural network will operate. The neural network can also include instructions, which can program the processing engine array 1310 to perform various computations on the weights and the input data. The instructions can also be stored in the memory subsystem 1304, in the memory banks 1314 or in a separate instruction buffer. The processing engine array 1310 can output intermediate results, which represent the outputs of individual layers of the neural network. In some cases, the activation engine 1316, the vector engine 1317, and/or pooling engine 1318 may be enabled for computations called for by certain layers of the neural network. The accelerator 1302 can store the intermediate results in the memory subsystem 1304 for inputting into the processing engine array 1310 to compute results for the next layer of the neural network. The processing engine array 1310 can further output final results from a last layer of the neural network. The final results can be stored in the memory subsystem 1304 and then be copied out to host processor memory or to another location.

Figure 14:
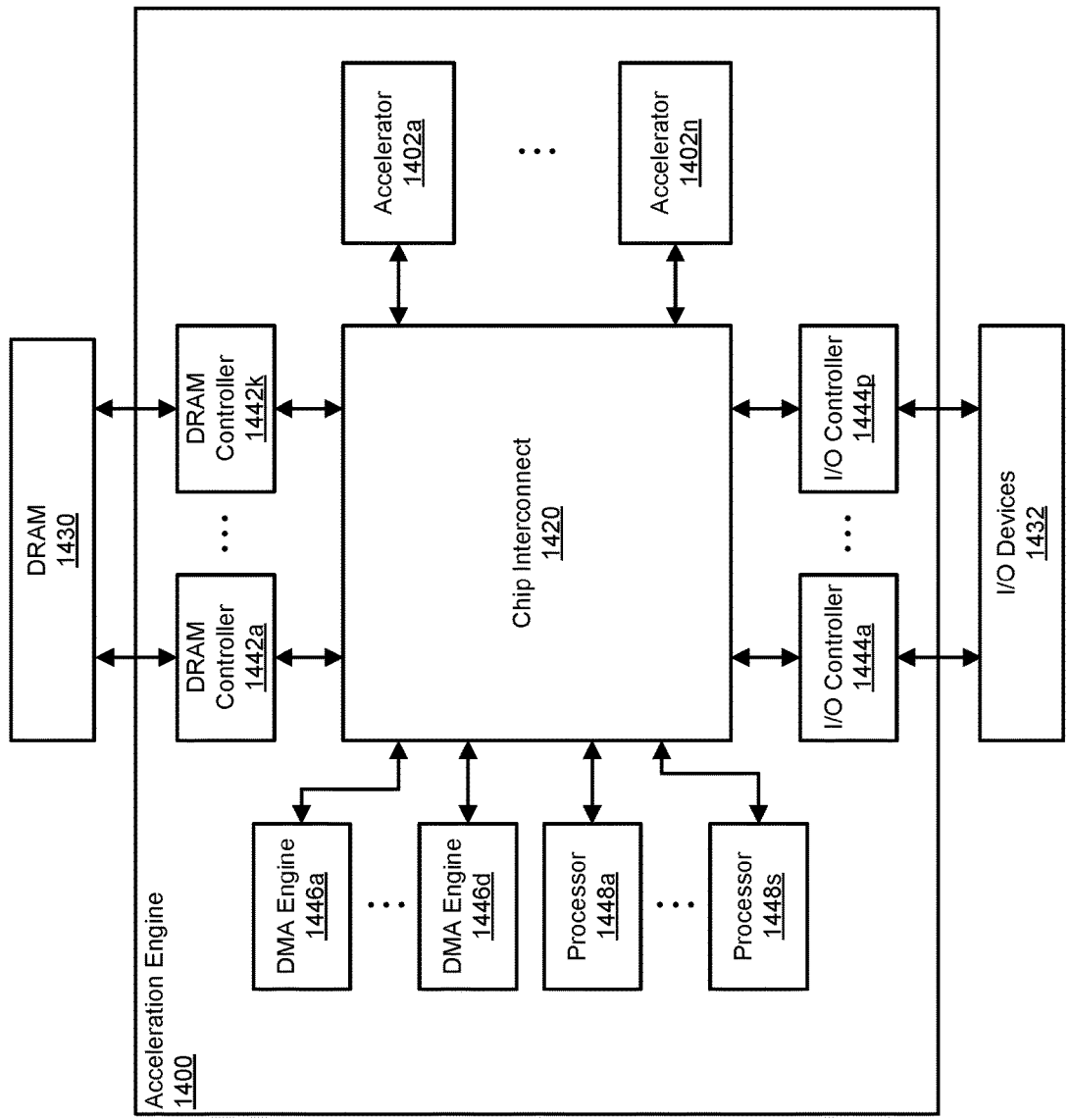
FIG. 14 illustrates a block diagram of an example of an acceleration engine.

FIG. 14 includes a block diagram that illustrates an example of an acceleration engine 1400. The acceleration engine 1400 is an example of an integrated circuit that can include one or more accelerators 1402a-1402n that may be similar to the accelerator illustrated in FIG. 13.

In the example of FIG. 14, the acceleration engine 1400 includes multiple accelerators 1402a-1402n, each of which can perform a set of operations. In various examples, the accelerators 1402a-1402n are for particular types of operations, so that the accelerators 1402a-1402n can perform the operations much faster than when similar operations are performed by a general purpose processor. In various examples, to perform a set of operations, input data on which the operations are to be performed must first be moved into the accelerators 1402a-1402n. Additionally, in some cases, program code is also moved into the accelerators 1402a-1402n, which programs the operations that the accelerators 1402a-1402n will perform on the data. In the illustrated example, the acceleration engine 1400 includes n accelerators 1402a-1402n. Examples of accelerators that can be included in the acceleration engine 1400 include graphics accelerators, floating point accelerators, neural network accelerators, and others. In various examples, the accelerators 1402a-1402n can each be the same (e.g., each of the is a graphics accelerator) or can be different (e.g., the accelerators 1402a-1402n include a graphics accelerator, a floating point accelerator, and neural network accelerator).

The example acceleration engine 1400 further includes DRAM controllers 1442a-1442k for communicating with an external memory. The external memory is implemented, in this example, using DRAM 1430. In the illustrated example, the acceleration engine 1400 includes k DRAM controllers 1442a-1442k, each of which may be able to communicate with an independent set of banks of DRAM. In other examples, other types of RAM technology can be used for the external memory. The DRAM controllers 1442a-1442k can also be referred to as memory controllers.

In various examples, input data and/or program code for the accelerators 1402a-1402n can be stored in the DRAM 1430. Different programs can cause the accelerators 1402a-1402n to perform different operations. For example, when one of the accelerators is a neural network accelerator, one program can configure the neural network accelerator to perform speech recognition while another program can configure the neural network accelerator to perform image recognition. In various examples, different accelerators 1402a-1402n can be programmed with different programs, so that each performs a different set of operations. In various examples, the processors 1448a-1448s can manage moving of program code from the DRAM 1430 to the accelerators 1402a-1402n.

The example acceleration engine 1400 further includes I/O controllers 1444a-1444p for communicating with I/O devices 1432 in the system. The acceleration engine 1400 can communicate with I/O devices over, for example, a processor bus. In some examples, the processor bus can be implemented using Peripheral Component Interconnect (PCI) and/or a variation of the PCI bus protocol. The processor bus can connect the acceleration engine 1400 to I/O devices such as, for example, input and output devices, memory controllers, storage devices, and/or network interface cards, among other things. In some examples, the I/O controllers 1444-1444p can enable the acceleration engine 1400 to act as an I/O device for a host processor. For example, the acceleration engine 1400 can be the recipient of input data from the host processor, and a command indicating an operation to be performed on the input data (e.g., a particular computation or analysis). In the illustrated example, the acceleration engine 1400 includes p I/O controllers 1444a-1444p, each of which may include a separate root complex and may communicate with a separate set of I/O devices 1432. In other examples, other standardized bus protocols, such as Ultra Path Interconnect (UPI) can be used for the host bus. In other examples, a proprietary bus protocol can be used.

Movement of data in the acceleration engine 1400 can be managed by one or more processors 1448a-1448s, which can also be referred to as data management processors. In the example of FIG. 14, the acceleration engine 1400 includes s processors 1448a-1448s incorporated into the device (e.g., on the same silicon die). In other examples, the processors 1448a-1448s can be external to the acceleration engine 1400 (e.g., on a different die and/or in a different package). In some examples, the processors 1448a-1448s can manage the movement of data from I/O devices 1432 to the accelerators 1402a-1402n or the DRAM 1430. For example, input data may be located at an I/O device 1432 or in processor memory, and the processors 1448a-1448s can move the input from the I/O device 1432 or processor memory into an accelerator or into DRAM 1430. As another example, program code for the accelerators 1402a-1402n may be located on an I/O device 1432 or in processor memory.

The example acceleration engine 1400 further includes DMA engines 1446a-1446d that can move data between the accelerators 1402a-1402n, DRAM controllers 1442a-1442k, and I/O controllers 1444a-1444p. In the illustrated example, the acceleration engine 1400 includes d DMA engines 1446a-1446d. In some implementations, the DMA engines 1446a-1446d can be assigned to specific tasks, such as moving data from the DRAM controllers 1442a-1442d to the accelerators 1402a-1402n, or moving data between the I/O controllers 1444a-1444p and the accelerators 1402a-1402n. These tasks can be assigned, for example, by enqueueing descriptors with the DMA engines 1446a-1446d, where a descriptor identifies an address for a block of data and an operation (e.g., a read or a write) to perform. A descriptor, for example, can direct a DMA engine to instruct a DMA controller to read a block of data from DRAM 1430. A descriptor can, as a further example, instruct the DMA engine to write data, read by the DMA controller, to an accelerator. Further descriptors can be used to move data from an accelerator to DRAM 1430.

In various examples, each of the processors 1448a-1448s can be responsible for managing the data movement for a different accelerator. In some examples, a processor may manage the data movement for more than one accelerator. Similarly, in various examples, each of the processors 1448a-1448s can be assigned to one or more DMA engines 1446a-1446d. In these and other examples, associations between processors 1448a-1448s, accelerators 1402a-1402n, and DMA engines 1446a-1446d are determined by program code being executed by each respective processor.

In the example acceleration engine 1400, the various components can communicate over a chip interconnect 1420. The chip interconnect 1420 primarily includes wiring for routing data between the components of the acceleration engine 1400. In some cases, the chip interconnect 1420 can include a minimal amount of logic, such as multiplexors to control the direction of data, flip-flops for handling clock domain crossings, and timing logic.

Figure 15:
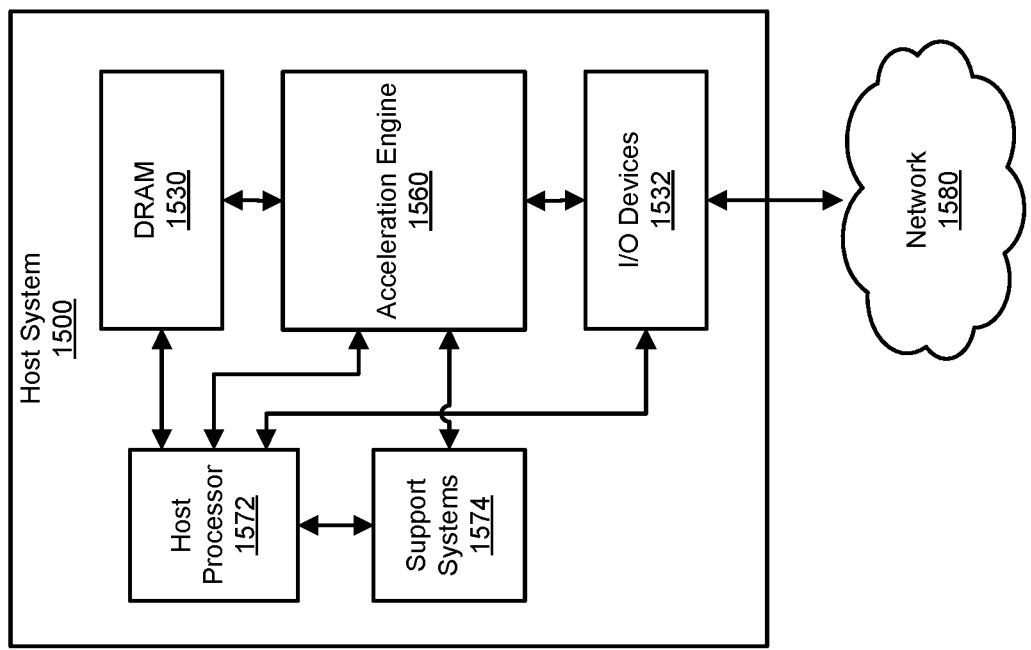
FIG. 15 illustrates a block diagram of an example of a host system.

FIG. 15 includes a block diagram that illustrates an example of a host system 1500 in which an acceleration engine 1560 can be used. The acceleration engine 1560 of FIG. 15 is an example of a device that can include one or more accelerators such as is illustrated in FIG. 14. The example host system 1500 of FIG. 15 includes the acceleration engine 1560, a host processor 1572, DRAM 1530 or processor memory, I/O devices 1532, and support systems 1574. In various implementations, the host system 1500 can include other hardware that is not illustrated here.

The host processor 1572 is a general purpose integrated circuit that is capable of executing program instructions. In some examples, the host processor 1572 can include multiple processing cores. A multi-core processor may include multiple processing units within the same processor. In some examples, the host system 1500 can include more than one host processor 1572. In some examples, the host processor 1572 and the acceleration engine 1560 can be one chip, such as, one or more integrated circuits within the same package.

In various examples, the host processor 1572 can communicate with other components in the host system 1500 over one or more communication channels. For example, the host system 1500 can include a host processor bus, which the host processor 1572 can use to communicate with the DRAM 1530, for example. As another example, the host system 1500 can include an I/O bus, such as a PCI-based bus, over which the host processor 1572 can communicate with the acceleration engine 1560 and/or the I/O devices 1532, for example. In various examples, the host system 1500 can, alternatively or additionally, include other communication channels or busses, such as serial busses, power management busses, storage device busses, and so on.

In some examples, software programs executing on the host processor 1572 can receive or generate input for processing by the acceleration engine 1560. In some examples, the programs can select an appropriate neural network to execute for a given input. For example, a program may be for language translation, and can select one or more neural networks capable of speech recognition and/or machine translation. In these and other examples, the programs can configure the acceleration engine 1560 with the neural network to execute, and/or can select a neural network processing engine on the acceleration engine 1560 that has previously been configured to execute the desired neural network. In some examples, once the acceleration engine 1560 has started an inference on input data, the host processor 1572 can manage the movement of data (such as weights, instructions, intermediate results, results of conditional layers, and/or final results) into or out of the acceleration engine 1560.

In some examples, a software program that is using the acceleration engine 1560 to conduct an inference can read the result from a conditional layer from the acceleration engine 1560 and/or from a storage location, such as in DRAM 1530. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1530 is memory that is used by the host processor 1572 for storage of program code that the host processor 1572 is in the process of executing, as well as values that are being operated on. In some examples, the data for a neural network (e.g., weight values, instructions, and other data) can be all or partially stored in the DRAM 1530. DRAM is a common term for processor memory, and though DRAM is volatile memory, processor memory can be volatile and/or non-volatile. Though not illustrated here, the host system 1500 can include other volatile and non-volatile memories for other purposes. For example, the host system 1500 can include a Read-Only Memory (ROM) that stores boot code for booting the host system 1500 at power on, and/or Basic Input/Output System (BIOS) code.

Though not illustrated here, the DRAM 1530 can store instructions for various programs, which can be loaded into and be executed by the host processor 1572. For example, the DRAM 1530 can be storing instructions for an operating system, one or more data stores, one or more application programs, one or more drivers, and/or services for implementing the features disclosed herein.

The operating system can manage and orchestrate the overall operation of the host system 1500, such as scheduling tasks, executing applications, and/or controller peripheral devices, among other operations. In some examples, a host system 1500 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1500. For example, some drivers can provide communication between the operating system and peripheral devices or I/O devices 1532. Alternatively or additionally, some drivers may provide communication between application programs and the operating system, and/or application programs and peripheral devices accessible to the host system 1500. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1532 can include hardware for connecting to user input and output devices, such as keyboards, mice, pens, tablets, voice input devices, touch input devices, displays or monitors, speakers, and printers, among other devices. The I/O devices 1532 can also include storage drives and/or network interfaces for connecting to a network 1580. For example, the host system 1500 can use a network interface to communicate with storage devices, user terminals, other computing devices or servers, and/or other networks, among various examples.

In various examples, one or more of the I/O devices 1532 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1500 or may be in an external enclosure. A storage device can be fixed (e.g., attached by screws) or removable (e.g., having a physical release mechanism and possibly a hot-plug mechanism).

Storage devices, the DRAM 1530, and any other memory component in the host system 1500 are examples of computer-readable storage media. Computer-readable storage media are physical mediums that are capable of storing data in a format that can be read by a device such as the host processor 1572. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1532 can be PCI-based devices. In these examples, a PCI-based I/O device includes a PCI interface for communicating with the host system 1500. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-My allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1574 can include hardware for coordinating the operations of the acceleration engine 1560. For example, the support systems 1574 can include a microprocessor that coordinates the activities of the acceleration engine 1560, including moving data around on the acceleration engine 1560. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1572. In some examples, the program executed by the microprocessor is stored on the hardware of microprocessor, or on a non-volatile memory chip in the host system 1500. In some examples, the microprocessor and the acceleration engine 1560 can be on chip, such as one integrated circuit on the same die and in the same package.

In some examples, the support systems 1574 can be responsible for taking instructions from the host processor 1572 when programs executing on the host processor 1572 request the execution of a neural network. For example, the host processor 1572 can provide the support systems 1574 with a set of input data and a task that is to be performed on the set of input data. In this example, the support systems 1574 can identify a neural network that can perform the task, and can program the acceleration engine 1560 to execute the neural network on the set of input data. In some examples, the support systems 1574 only needs to select an appropriate neural network processing engine of the neural network processor. In some examples, the support systems 1574 may need to load the data for the neural network onto the acceleration engine 1560 before the acceleration engine 1560 can start executing the neural network. In these and other examples, the support systems 1574 can further receive the output of executing the neural network, and provide the output back to the host processor 1572.

In some examples, the operations of the support systems 1574 can be handled by the host processor 1572. In these examples, the support systems 1574 may not be needed and can be omitted from the host system 1500.

In various examples, the host system 1500 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1500 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
   receiving, by a data processor, a set of machine instructions to execute, wherein the set of machine instructions includes a beam search operation to find M largest tensor values; and
   executing, by the data processor, a number of execution iterations to perform the beam search operation, wherein the number of execution iterations is determined based on a ratio of M to N, wherein N is a number of pipelined stages of arithmetic logic units (ALUs) in the data processor, wherein executing the number of execution iterations includes:

executing a Max-N machine instruction in each iteration of the execution iterations to find N largest values in an input tensor;
executing a Find-Index-N machine instruction in each iteration of the execution iterations to find indices corresponding to the N largest values in the input tensor; and
executing a Match-Replace-N machine instruction in each iteration except for a last iteration of the execution iterations to replace the N largest values in the input tensor with a minimum value to generate a next input tensor for a next iteration.

2. The computer-implemented method of claim 1, wherein the N largest values in the input tensor include duplicate values.

3. The computer-implemented method of claim 1, wherein the beam search operation is part of a neural network model.

4. The computer-implemented method of claim 3, wherein the neural network model is part of a natural language processing application.

5. A computer-implemented method for performing a beam search operation, the method comprising:
retrieving a set of machine instructions from an instruction buffer of a data processor, wherein the instruction buffer includes a plurality of entries, and wherein each entry stores one machine instruction;
executing a first machine instruction from the set of machine instructions to obtain N largest values in an input tensor by inputting data elements of the input tensor into an execution engine, N being an integer greater than one; and
subsequent to obtaining the N largest values, executing a second machine instruction from the set of machine instructions to obtain indices of the input tensor corresponding to the N largest values by inputting the data elements of the input tensor into the execution engine again.

6. The computer-implemented method of claim 5, wherein the first machine instruction operates on a source tensor of variable length, and writes N number of elements containing N largest values in the source tensor to a destination tensor in a sorted order.

7. The computer-implemented method of claim 5, wherein the second machine instruction operates on a first source tensor of variable length and a second source tensor having N number of values, and writes N number of elements to a destination tensor, wherein the N number of elements contain indices indicating locations of the values of the second source tensor in the first source tensor.

8. The computer-implemented method of claim 5, further comprising:
executing a third machine instruction from the set of machine instructions to replace the N largest values in the input tensor with a minimum value to generate a next input tensor.

9. The computer-implemented method of claim 8, wherein the minimum value is a value representing negative infinity.

10. The computer-implemented method of claim 8, wherein the third machine instruction operates on a first source tensor of variable length, a second source tensor having N number of values, and a replacement value, and copies the first source tensor to a destination tensor while replacing a first occurrence of the values of the second source tensor in the first source tensor with the replacement value.

11. The computer-implemented method of claim 8, further comprising:
executing the first machine instruction again to obtain a next N largest values in the input tensor; and
executing the second machine instruction again to obtain indices of the input tensor corresponding to the next N largest values.

12. The computer-implemented method of claim 5, wherein N represents a number of pipelined stages in an execution channel.

13. A data processor comprising:
an instruction buffer operable to store pending machine instructions;
an instruction decoder operable to decode machine instructions stored in the instruction buffer for execution; and
a processing circuit having N number of pipelined arithmetic logic unit (ALU) stages and operable to execute a first machine instruction on an input tensor to obtain N largest values in the input tensor, wherein each of the N number of pipelined ALU stages is operable to identify a respective one of the N largest values in the input tensor, and wherein N is an integer greater than one.

14. The data processor of claim 13, wherein the processing circuit is operable to execute a second machine instruction on the input tensor to obtain indices corresponding to the N largest values in the input tensor.

15. The data processor of claim 14, wherein the processing circuit is operable to execute a third machine instruction on the input tensor to replace the N largest values in the input tensor with a minimum value.

16. The data processor of claim 13, wherein the processing circuit includes at least eight pipelined ALU stages.

17. The data processor of claim 13, wherein the data processor is a neural network accelerator.

18. A non-transitory computer readable medium having stored therein instructions that, when executed by one or more processors, cause the one or more processors to execute a compiler, the compiler performing operations comprising:
receiving a description of a neural network model that contains a beam search operation; and
generating one or more Max-N machine instructions and one or more Find-Index-N instructions,
wherein execution of a single Max-N machine instruction is operable to find N largest values in an input tensor, N being an integer greater than one, and
wherein execution of a single Find-Index-N machine instruction is operable to find indices corresponding to the N largest values in the input tensor.

19. The non-transitory computer readable medium of claim 18, wherein the beam search operation is for finding M largest values in the input tensor, M being greater than N, and wherein the operations further comprise:
generating a Match-Replace-N machine instruction to replace the N largest values in the input tensor with a minimum value.

20. The non-transitory computer readable medium of claim 19, wherein the operations further comprise:
generating machine instructions to iterate through the Max-N, Find-Index-N, and Match-Replace-N instructions based on a ratio of M to N.

* * * * *